US006495617B1

(12) United States Patent
Tsouris et al.

(10) Patent No.: US 6,495,617 B1
(45) Date of Patent: Dec. 17, 2002

(54) METHODS TO CONTROL PHASE INVERSIONS AND ENHANCE MASS TRANSFER IN LIQUID-LIQUID DISPERSIONS

(75) Inventors: Constantinos Tsouris; Junhang Dong, both of Oak Ridge, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 0 days.

(21) Appl. No.: 09/397,281

(22) Filed: Sep. 16, 1999

(51) Int. Cl.[7] .................................................. C08J 3/28
(52) U.S. Cl. ........................................................ 523/300
(58) Field of Search .......................................... 523/300

(56) References Cited

U.S. PATENT DOCUMENTS

| | | | |
|---|---|---|---|
| 4,591,609 | A | 5/1986 | Kubo et al. |
| 5,116,536 | A | 5/1992 | Bucheler et al. |
| 5,688,842 | A | 11/1997 | Pate, III et al. |

OTHER PUBLICATIONS

Satoru Kato et al., "Types of Dispersion in Agitated Liquid–Liquid Systems", *The Canadian Journal of Chemical Engineering*, vol. 69, Feb. 1991, pp. 222–227.

J.A. Quinn et al., "Phase Inversion in the Mixing of Immiscible Liquids", *The Canadian Journal of Chemical Engineering*, Feb. 1963, pp. 15–18.

A. H. Selker et al.; "Factors Affecting which Phase will Disperse when Immiscible Liquids are Stirred Together", *The Canadian Journal of Chemical Engineering*, Dec. 1965, pp. 298–301.

Usami et al., "Application of Electrically Driven Liquid–Liquid Dispersion to Solvent Extraction Using Tri–n–Buthyl Phosphate", *Journal of Nuclear Science and Technology*, Oct. 1993, pp. 1017–1023.

Norato et al., "Phase Inversion Studies in Liquid–Liquid Dispersions", *The Canadian Journal of Chemical Engineering*, vol. 76, Jun. 1998, pp. 486–494.

Tsouris et al., "Breakage and Coalescence Models for Drops in Turbulent Dispersions", *AIChE Journal*, Mar. 1994, vol. 40, No. 3, pp. 395–406.

Baygents et al., "Electrohydrodynamic demormation and interaction of drop pairs", *J. Fluid Mech.* (1998), vol. 368, pp. 359–375.

Tobin et al., "Coalescence of Charged Droplets in Agitated Liquid–Liquid Dispersions", *AIChE Journal,* Aug. 1992, vol. 38, No. 8, pp. 11991205.

Coulaloglou et al., "Description of Interaction Processes in Agitated Liquid–Liquid Dispersions", *Chemical Engineering Science*, 1977, vol. 32, pp. 1289–1297.

W.J. Howarth, "Measurement of Coalescence Frequency in an Agitated Tank", *AIChE Journal*, Sep. 1967, vol. 13, No. 5, pp. 1007–1013.

Pacek et al., 37 Video Technique for Measuring Dynamics of Liquid–Liquid Dispersion During Phase Inversion, *AIChE Journal,* Dec. 1994, vol. 40, No. 12, pp. 1940–1949.

Gilchrist et al., "Delayed phase inversion in stirred liquid–liquid dispersions", *Chemical Engineering Science*, vol. 44, No. 10, 1989, pp. 2381–2384.

Kumar et al., "Influence of the wetting characteristics of the impeller on phase inversion", *Chemical Engineering Science*, vol. 46, No. 9, 1991, pp. 2365–2367.

Guilinger et al., "Phase Inversion Behavior of Water–Kerosene Dispersions", *Ind. Eng. Chem. Res.*, 1988, 27, pp. 978–982.

Ptasinski et al., "Electric Field Driven Separations: Phenomena and Applications", *Separation Science and Technology*, 27(8&9), 1992, pp. 995–1021.

Luhning et al., "Phase inversion in stirred liquid–liquid systems", *Society of Chemical Industry*, 1971, pp. 873–887.

*Primary Examiner*—Edward J. Cain
(74) *Attorney, Agent, or Firm*—Kilpatrick Stockton LLP

(57) ABSTRACT

The present invention is directed to the effects of applied electric fields on liquid-liquid dispersions. In general, the present invention is directed to the control of phase inversions in liquid-liquid dispersions. Because of polarization and deformation effects, coalescence of aqueous drops is facilitated by the application of electric fields. As a result, with an increase in the applied voltage, the ambivalence region is narrowed and shifted toward higher volume fractions of the dispersed phase. This permits the invention to be used to ensure that the aqueous phase remains continuous, even at a high volume fraction of the organic phase. Additionally, the volume fraction of the organic phase may be increased without causing phase inversion, and may be used to correct a phase inversion which has already occurred. Finally, the invention may be used to enhance mass transfer rates from one phase to another through the use of phase inversions.

32 Claims, 12 Drawing Sheets

0 V 1 kV

0 V 1 kV

| | Tot./Water | Tol/Water/Isoprop. |
|---|---|---|
| Aqueous Phase Conductivity | 0.883 $\mu\Omega^{-1}{}_{cm}{}^{-1}$ | 0.879 $\mu\Omega^{-1}{}_{cm}{}^{-1}$ |
| Interfacial Tension | 31.0dyn/cm | 10.5dyn/cm |
| Coalescence Voltage | 900V | 600V |

$R_t$ is the molar ratio of isopropanol/water at time t.
$R_e$ is the equilibrium molar ratio of isopropanol/water.

METHODS TO CONTROL PHASE INVERSIONS AND ENHANCE MASS TRANSFER IN LIQUID-LIQUID DISPERSIONS

This invention was made with Government support under Contract No. DE-AC05-96OR22464 awarded by the U.S. Department of Energy to Lockheed Martin Energy Research Corp. and Contract No. DE-AC05-84OR21400 awarded by the U.S. Department of Energy to Lockheed Martin Energy Systems, Inc., and the Government has certain rights in this invention.

FIELD OF THE INVENTION

The present invention is directed to a method for controlling a phase inversion in a liquid-liquid dispersion. In particular, the present invention is directed to the control of a phase inversion in a liquid-liquid dispersion through the application of electric fields. The present invention is also directed to the enhancement of mass transfer between two liquids in a liquid-liquid dispersion.

BACKGROUND OF THE INVENTION

Liquid-liquid dispersions are made of two immiscible or partially miscible liquids and are used in many chemical processes. Liquid-liquid dispersions exist in many different areas. For example, in the oil and gas industry, there are oil and water emulsions, which usually have to be separated. Additionally, in the pharmaceutical industry, liquid-liquid dispersions are used for several purposes, including the transfer of a solute from one liquid to another and for polymerization reactions. Finally, liquid-liquid dispersions may be used in chemical separations and clean-up operations to remove a toxin or other undesirable compound from a liquid.

In a liquid-liquid dispersion, there are two liquid immiscible phases, one dispersed as droplets and the other continuous. There are several chemical processes, including, for example, chemical separations and polymerization reactions, in which it is desired to have a high volume fraction of each phase. As one increases the dispersed-phase volume fraction, however, in a liquid-liquid system, there is a risk of phase inversion.

Phase inversion in liquid-liquid dispersions is the phenomenon in which the dispersed phase becomes continuous and the continuous phase becomes dispersed. It is often referred to as a "catastrophic" phenomenon because (i) when phase inversion occurs, the physical properties of the dispersed and continuous phases change abruptly and (ii) inversion back to the initial state of the dispersion involves interruption of the process.

Phase inversion is affected by a variety of factors including the physical properties of both liquid phases in the dispersion, the geometry and materials of the equipment, and the initial and operational conditions. In an aqueous/organic dispersion, if the volume fraction of the organic phase is plotted versus agitation intensity, a region termed the "ambivalence region" exists in which either phase can be continuous or dispersed. The initial conditions usually determine which phase (aqueous or organic) will be continuous or dispersed. For example, it has been reported in the literature (Gilchrist et al., 1989) that the liquid phase which is continuous is likely to remain the continuous phase once agitation is initiated. If the volume fraction of the organic phase is greater than the upper bound of the ambivalence region, then the organic phase is continuous and the aqueous is dispersed. Similarly, if the volume fraction of the organic phase is below the lower bound of the ambivalence region, the aqueous phase is continuous and the organic is dispersed.

Effects of physical properties such as density, viscosity, and interfacial surface tension on phase inversion and the ambivalence region have been examined by several investigators (Quinn and Sigloh, 1963; Selker and Sleicher, 1965; Luhning and Sawistowski, 1971; Guilinger et al., 1988; Norato et al., 1998). Effects of equipment geometry and materials of construction have also been examined (Gilchrist et al., 1989; Kumar et al., 1991). A phase-inversion delay time has been investigated by Gilchrist et al. (1989), Kato et al. (1991), and Pacek et al. (1994).

However, these studies have failed to discover a method by which these phase inversions may be stopped, or reversed quickly if the phase inversion has started. As mentioned, phase inversions often are highly undesirable. Typically, when a phase inversion occurs during a process, the process must be shut down, thereby resulting in time and expense for correcting the phase inversion and for the loss in operating time.

Additionally, the prior art has failed to discover methods for controlling phase inversions. These methods would enhance the use of liquid-liquid dispersions as previously discussed by permitting higher volume fractions of the dispersed organic phase without inducing phase inversion. Also, these methods could enhance mass transfer rates from one phase to another to improve the effectiveness of using liquid-liquid dispersions in polymerization reactions and chemical separations.

Some of the prior art has examined the use of applied electric fields in liquid-liquid dispersions. Electric fields have been used to enhance coalescence and removal of small aqueous droplets from an organic continuous phase (e.g., Ptasinski and Kerkhof, 1992). The enhancement of drop coalescence is due to polarization of the conductive droplets in the electric field and mutual attraction (Baygent, et al., 1998). However, while these methods have shown to be effective at separating one liquid from another, they do not teach or suggest a method by which phase inversions may be prevented or reversed.

Accordingly, what is needed is a method of controlling phase inversions in liquid-liquid dispersions to prevent an inversion from occurring or reverse the inversion should one occur. Also what is needed is a method for permitting the increase in the volume fraction of a dispersed organic phase without causing a phase inversion. Finally, what is needed is a method to enhance mass-transfer of a solute from one phase to another in a liquid-liquid dispersion.

SUMMARY OF THE INVENTION

The present invention seeks to provide a method of controlling phase inversions in liquid-liquid dispersions to prevent an inversion from occurring. The present invention also seeks to provide a method of correcting a phase inversion without shutting down the ongoing process. Additionally, the present invention also seeks to provide a method of increasing the volume fraction of a dispersed organic phase without causing a phase inversion. Finally, the present invention seeks to provide a method for enhancing mass transfer of a solute from one phase to another in a liquid-liquid dispersion.

In accordance with the present invention, these objects are accomplished by a method for controlling phase inversions in a liquid-liquid dispersion. By being able to control the dispersion, it is possible to prevent a phase inversion from occurring or reverse one that has already occurred. Additionally, by being able to prevent a phase inversion, it is possible to achieve a higher volume of the dispersed phase without causing phase inversion. Finally, by causing and reversing phase inversions in some chemical processes, it is possible to enhance mass transfer of a solute from one phase to another.

The present invention controls phase inversions through the application of an electric field to the liquid-liquid dispersion. The liquid-liquid dispersion will typically comprise a continuous aqueous phase and a dispersed organic phase. The electric field enhances the coalescence efficiency and the coalescence rate of the aqueous phase, thereby causing a continuous aqueous phase to remain continuous, even at higher volume fractions of the dispersed organic phase. Additionally, if a phase inversion has occurred, the electric field will enhance the coalescence of the dispersed aqueous droplets to cause the aqueous phase to become continuous, thereby reversing the phase inversion. Finally, by alternately applying and disengaging the electric field, it is possible to alternately cause and reverse phase inversions within a liquid-liquid dispersion, thereby enhancing mass transfer rates of a solute from one phase to another.

The electric field is applied to the dispersion with the objective of maintaining a dispersion in which the more conductive phase, typically an aqueous phase, is continuous and the less conductive phase, typically organic, is dispersed. This objective is achieved using two electrodes which are introduced into the dispersion. The electrodes are connected to a power supply. An electrical signal applied to the electrodes results in an aqueous-continuous/organic-dispersed dispersion. If initially the dispersion is aqueous-dispersed/organic-continuous, the electric field enhances coalescence of the aqueous droplets, which eventually causes phase inversion. On the other hand, if the dispersion is aqueous-continuous/organic-dispersed, the electric field ensures that the phase inversion will not occur.

If the composition of the dispersion is located above the ambivalence region for the dispersion, then alternately applying and disengaging an electric field will result in alternately causing and reversing a phase inversion within the liquid-liquid dispersion. By turning the electric field on and off, the present invention may be used to better control and optimize processes that involve liquid-liquid dispersions.

These and other objects, features and advantages of the present invention will become apparent after a review of the following detailed description of the disclosed embodiments and the appended claims.

DETAILED DESCRIPTION OF THE INVENTION

The present invention is directed to a method for controlling a phase inversion in a liquid-liquid dispersion and, in particular, to the control of a phase inversion in a liquid-liquid dispersion through the application of electric fields.

The application of an electric field to the liquid-liquid dispersion enhances the coalescence efficiency and the coalescence rate of the first liquid phase, thereby causing the first liquid phase to remain the continuous phase. The second liquid phase will, therefore, remain dispersed within the continuous phase. Additionally, if a phase inversion has occurred, the electric field will enhance the coalescence of the dispersed first liquid phase droplets to cause the first liquid phase to become continuous, thereby reversing the phase inversion. Additionally, by increasing the coalescence efficiency and the coalescence rate, the method also decreases the time needed for the first liquid to coalescence.

The present invention may also be used to enhance mass transfer rates from one phase to another by inducing phase inversion. This is accomplished by turning the electric field on and off when the composition of the liquid-liquid dispersion is above the ambivalence region. The "ambivalence region" is defined as the range of the organic-phase volume fraction in which either of the aqueous phase or the organic phase may be continuous and the other dispersed. Outside this region, only the liquid of the higher volume fraction may be continuous and only that of the lower volume fraction may be dispersed. These phase inversions will enhance mass transfer rates of a solute from one phase to another.

The methods of the present invention comprise applying an electric field to the liquid-liquid dispersion to cause a first liquid of the liquid-liquid dispersion to remain in a continuous phase and to cause a second liquid of the liquid-liquid dispersion to remain dispersed in the continuous phase. The strength of the electric field is chosen based upon a multitude of factors including, but not limited to, the conductivities of the first and second liquids, the viscosities of the two liquids, the surface tension of the two liquids, and the pH of the system. These factors will also have an effect on the maximum volume fraction of the dispersed liquid, the ambivalence region of the system, and the size of the dispersed droplets.

Figure 1:
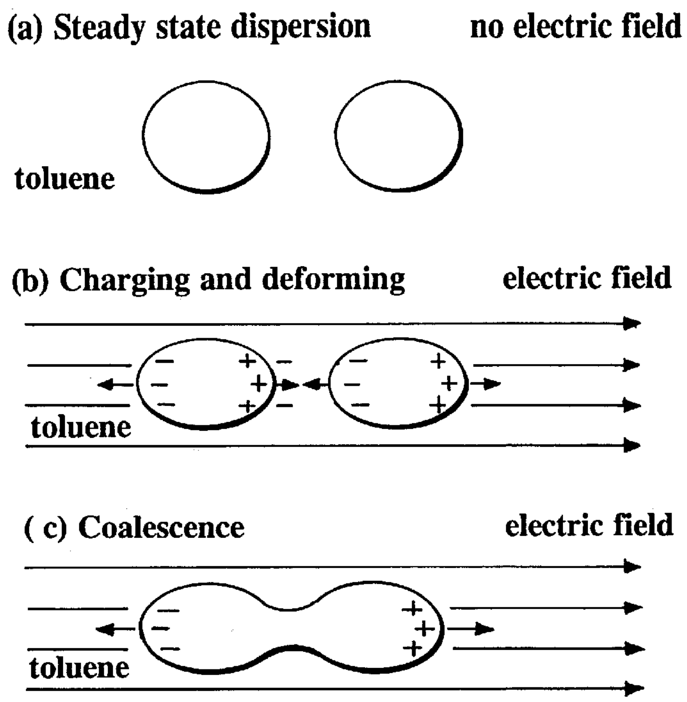
FIGS. 1*a–c* show the effects on coalescence of water droplets by the application of an electric field on water droplets dispersed in a toluene continuous phase.

The application of the electric field is directed to the more conductive liquid in the liquid-liquid dispersion. If the dispersed phase is more conductive than the continuous phase, applying an electric field to the dispersion will facilitate the coalescence of the dispersed droplets and thus shift the dynamic equilibrium. The mechanism of the effects of electric fields on phase inversion is depicted in FIG. 1 for the present system. Droplets of water, which is more conductive than toluene, are polarized under an electric field with opposite polarities on the adjacent ends. The attractive coulombic force then draws the droplets together and thus enhances the coalescence rate. On the other hand, breakup leads to the formation of charged droplets, which also have higher collision and coalescence rates. Induced phase inversion by an electric field indicates that the presence of larger droplets in the dispersion, due to enhanced coalescence under the electric field, further increases the coalescence rate of the droplets so that the breakup rate cannot follow. This leads to phase inversion.

The specifications for the electric field applied will vary depending on the liquid-liquid dispersion to which the field is applied. This provides a wide degree of flexibility in determining the type of signal, the strength of the signal, the duration of the field, the signal characteristics, the current, the frequency, and the power, among others.

The type of electric field used is dependent upon the desired operating parameters of the system. Any type of electric signal may be used including, but not limited to, AC, DC, or pulsed DC.

The amount of voltage and the strength of the field are also not critical. Preferably, the amount of voltage applied is from about 20 to about 5000 V, and more preferably from about 60 to about 1200 V. As you increase the amount of voltage, the higher the volume fraction of the dispersed phase may be without resulting in phase inversion. However, each liquid-liquid dispersion will have its limits based upon the physical characteristics of the liquids. Therefore, voltages in excess of 1200 V may be used, depending on the dispersion to be treated.

The field strengths which may be used may also vary considerably. These strengths may range anywhere from about 0 to about 10 kV/cm. However, care must be taken depending on the conductivity of the liquids, especially the more conductive liquid, which forms the continuous phase. Normally, as the conductivity of the continuous liquid increases, the amount of voltage used should be decreased as this will help prevent problems that may result from using too high a voltage. For example, if conductive water were the continuous phase, applying too high a voltage might result in high current, arcing, electrolysis and electroplating, potentially destroying the usefulness of the system. Therefore, while there are no practical limits on the amount of voltage used or the field strength, there may be limiting factors inherent in a particular system.

Additionally, if the electrical signal used is AC or pulsed DC, the frequency of the signal is also not critical. In general, the frequency can range from about 0 to about 10 kHz. The actual frequency used will be dependent upon the desired operating parameters of the system. However, typically the frequency will range from about 1 to about 300 Hz.

The current used is another non-critical operating parameter of the present invention. As long as there are no detrimental effects on the liquids treated, there are no limitations on the amount of current used. However, for economic reasons, it is preferred that the current range from about 0 to about 100 mA to minimize the costs in operating the method.

For some uses in liquid-liquid dispersion systems, agitation may be employed to enhance contact between the two liquids, thereby enhancing mass transfer rates between the two liquids. If agitation is used, the agitator will break up the droplets of the dispersed phase. As the droplets are broken up, they will contact other droplets and coalesce. Should the rate at which the droplets coalesce exceed the rate at which the droplets are broken up, then the dispersed droplets will gradually become the continuous phase, thereby resulting in a phase inversion. As already discussed, the electric field will increase the coalescence efficiency and rate of the more conductive liquid. Therefore, the electric field will help the more conductive liquid remain as the continuous phase despite higher and higher volume fractions of the dispersed phase. Conversely, the electric field may help the more conductive liquid phase invert from the dispersed phase to the continuous phase, even in the presence of mixing means. Therefore, the present invention may be used with any type of agitation means including, but not limited to, a mixing device, a sonication device, or a flow device, such as a pipe. The choice of which agitation means are used will be dependent on the liquid-liquid dispersion being treated and the desired operating parameters.

The agitation has an effect on the rate of coalescence. As energy is provided from the agitation, the droplets will break up. These drops will also coalesce as they contact one another. Over time, the rate of break-up will equal the rate of coalescence. At this moment, the dispersed phase is considered to be at "steady-state". When the system reaches steady-state, the size of the drops will also reach an equilibrium. The size of the drops will have an effect on their ability to coalesce. Smaller drops are harder to coalesce. Therefore, if the desired result is to create a phase inversion, then more electric energy must be supplied to cause the dispersed phase to coalesce and become continuous. However, if the desired effect is to prevent a phase inversion, then the application of the electric field will allow a higher volume fraction of the dispersed phase to be added. This will result in larger droplets. If the droplets get too big, they will coalesce faster than they can be broken up, thereby causing a phase inversion.

Another factor to consider is the viscosity of the liquids. If either phase is highly viscous, it will be more difficult to break up and coalesce droplets. In these systems, a higher electric field will be needed to cause a phase inversion.

The apparatus in which the methods of the present invention are performed may also vary depending on the liquid-liquid dispersion. The only limitation on the apparatus is that it must have at least two electrodes, one positive and one negative, one positive and one electrically grounded, or one negative and one grounded. However, the placement of those electrodes within the tank is not critical. Also, the size of the apparatus and the materials of construction may also vary. For example, for methods involving a small amount of the dispersion, the reactor may be sized appropriately. In methods wherein one or both of the liquids are corrosive, specially-treated materials may be used, such as stainless steel.

As discussed, the only limitation is that the apparatus contain at least two electrodes. However, even this limitation provides some flexibility. For example, while it is preferred that two separate electrodes be inserted into a reactor, the electrodes may be combined with other parts of the reactor. In one embodiment, the reactor may be made from a conductive material, thereby allowing the reactor to be used as one of the electrodes. Alternately, metal baffles may be included in the reactor and these may be used as one of the electrodes. Also, if the reactor has a mixing device, then the support means for the mixing device may be used as an electrode, provided it is metal. Lastly, while only two electrodes are needed, it is possible for the apparatus to include an array of electrodes.

Figure 2:
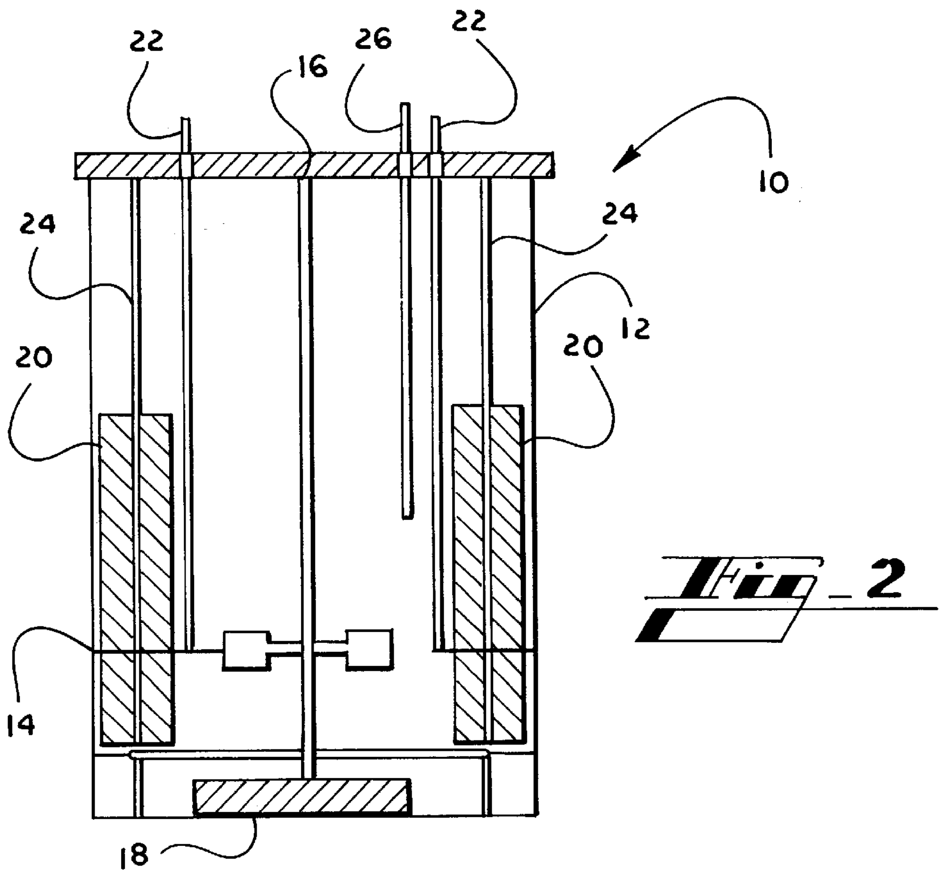
FIG. 2 depicts one embodiment of an apparatus useful in carrying out the methods of the present invention.

While there is no set structure for the apparatus described, FIG. 2 sets forth a preferred embodiment of an apparatus which may be used to carry out the methods of the present invention. The reactor 10 comprises a tank 12 having therein an impeller 14 attached to a shaft 16 and a motor 18 for operating the impeller. The reactor 10 also includes a plurality of baffles 20 located near the outer edge of the tank 12 for enhancing the mixing of the dispersion and the resulting interfacial contact between the two liquids. The reactor 10 also includes two electrodes 22 for generating the electrical signal. The electrodes 22 are attached to a power supply (not shown) and extend into the tank through the lid 23 on the tank. These electrical signals may be AC, DC, pulsed DC, or any other signal type desired. The reactor may also include supports 24 for the baffles and/or a thermometer 26 for measuring the temperature of the dispersion. The supports 24 and the thermometer 26 also extend through the lid 23. The supports 24 may also be cooling pipes attached to a recirculation unit (not shown) for regulating the temperature of the tank 12. As previously discussed, while two electrodes 22 are used, any of the tank 12, the shaft 16, the baffles 20, or the supports 24 may be used as one or both of the electrodes.

The methods of the present invention may be used in any liquid-liquid extraction process. For example, the methods may be used in a liquid extraction process wherein an immiscible solvent is added to a liquid containing a solute to form a dispersion. Then, the solute will slowly pass from the liquid into the solvent. The methods of the present invention may enhance this solute transfer in two different manners. First, by permitting higher volume fractions of the dispersed (solvent) phase, then the transfer will occur at an accelerated rate. Also, once the volume fraction of the dispersed phase is above the ambivalence region for the system, then the electric field may be turned on and off to cause the system to undergo a series of phase inversions. These phase inversions will enhance the mixing within the system, thereby increasing the rate of transfer. This type of system may be operated manually, or it may be controlled automatically.

The present invention may also be used in emulsion polymerization reactions. In these reactions, a chemical is transferred from one phase to another where the chemical reacts with the second phase to form the emulsion polymer. Again, by permitting higher volume fractions and by causing the system to undergo a series of phase inversions, the rate at which the polymerization reaction occurs may be increased.

Liquid extraction is another process which may be enhanced by the present invention. In liquid extraction, a chemical, which may be either a desirable or an undesirable compound, is dissolved in a liquid phase. Then, a second liquid, which has a greater affinity for the chemical, is added to the first liquid to form a dispersion. Or, the second liquid may be passed through the first liquid in a counter-current fashion. As the second liquid passes the first liquid, the chemical passes from the first liquid phase to the other. If mixing is useful in the transfer, then the electric field may be turned on and off to create phase inversions to enhance mixing. However, if the phase inversion would be catastrophic, then in these instances, it is desirable to have as high a volume fraction as possible of the second liquid. The application of the electric field will allow higher volume fractions by helping to keep the first liquid as the continuous phase.

Other industries in which the present invention may be used include, but are not limited to, the chemical industry, the oil and gas industry, pharmaceuticals, the biotechnology industry, cosmetics, and the fertilizer industry.

The types of liquids to which the electric field may be applied may also vary widely. Typically, liquid-liquid dispersions comprise an aqueous phase and an organic phase. However, the present invention is not limited to these systems. Since the electric field affects the conductivity of the liquids, the process may also be used on a system which has a highly conductive liquid and a low-conductivity liquid. The electric field will cause the highly conductive liquid to coalesce and become the continuous phase, even if this liquid was originally the dispersed phase.

The polarity of the two liquids may also be used in determining which liquids may be used in the dispersion. If one liquid is polar and the other non-polar, then the electric field will cause coalescence of the polar liquid. The viscosity of the liquids will have an effect on the size of the drops.

Therefore, since there are no major limitations on the liquid systems in which the process is used, the dispersion may be selected from a wide variety of liquids. Liquids which may be used include, but are not limited to, water, alcohols, such as ethanol, methanol, propanol, etc., and organics, such as hexane, benzene, toluene, heptane, octane, etc.

Additionally, additives may be added to the liquids to change the physical and chemical characteristics of the liquids including, but not limited to, conductivity, viscosity, density, interfacial tension, and pH. Examples of additives which may be used include salts, acids, bases, alcohols, surfactants, and polymers.

EXAMPLES

Example 1–8

In these Examples, an Omni-culture bench-top fermentor (VirTis Co., Geadinger, N.Y.) was used as the liquid-liquid dispersion tank. The tank, which had a 1750-mL total capacity, 10.2-cm inner diameter, and 21.5-cm height, was equipped with two baffles symmetrically mounted on the tank wall and a six-blade Rushton impeller located at the central axis and at a distance of 5.1 cm from the bottom of the tank. The impeller was driven by a magnetic rotor, which provided a maximum agitation speed of 1250 RPM. The impeller-to-tank diameter ratio was 0.49. A total amount of 1000 mL of liquid was maintained in each Example so as to give a corresponding liquid height of about 12.3 cm in the tank. Two electrodes made of stainless-steel rods of 0.6 cm in diameter were mounted on the cover of the tank, at a distance of 7.1 cm between each other. Both electrodes were immersed 7.0 cm in the liquid dispersion. The temperature of the dispersion was controlled by a stainless steel cooling pipe, which was also used for holding the baffles. The tank is shown in FIG. 2, which has already been described.

Figure 3:
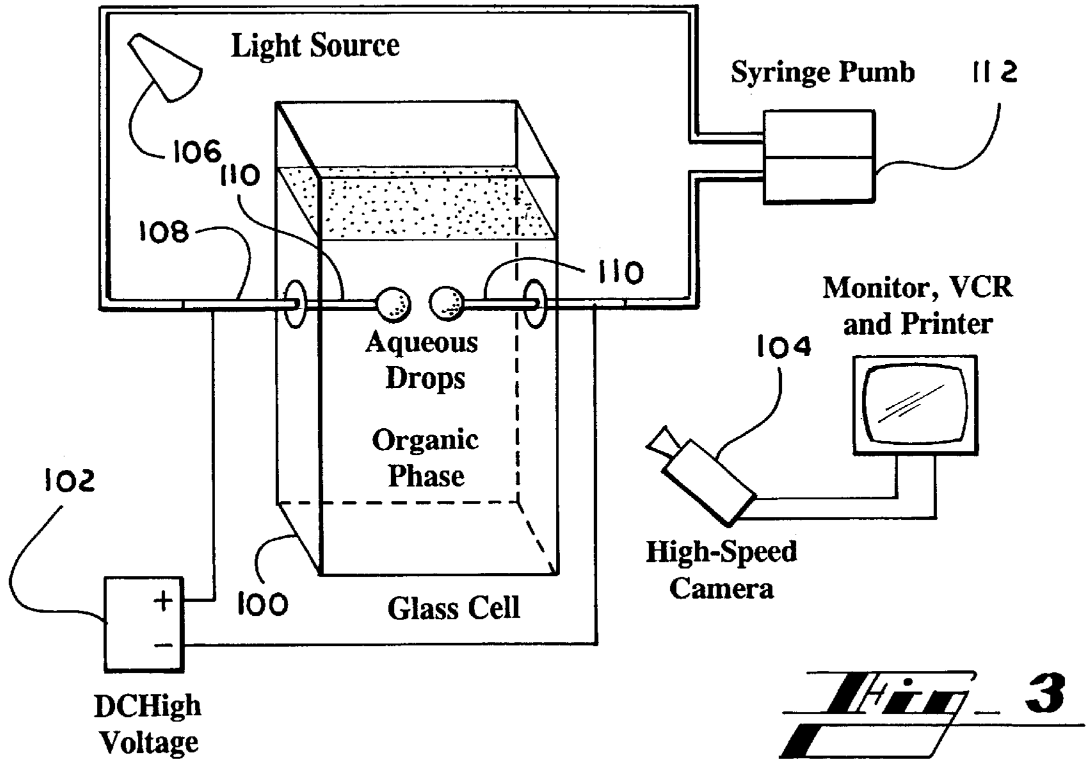
FIG. 3 depicts a schematic diagram of an experimental set-up for drop coalescence.

Coalescence of two drops was investigated using an experimental set-up schematically shown in FIG. 3. These Examples were employed to better explain the mechanism of phase inversion. The set-up included a rectangular glass cell 100, a DC power supply 102, and a high-resolution, high-speed video camera 104 (Ektapro High Gain hnage, Kodak) with a light source 106. Two stainless steel capillary tubes 108, 1.25-mm outer diameter and 1.0-mm inner diameter, were mounted through the glass wall and positioned at the same axis with the tips 110 facing each other. These two tubes 108 were connected to an electric power supply (not shown). The tips 110 of the tubes were immersed in the organic phase. Aqueous drops were produced by a syringe pump 112 (ATI Orion 361, Sage Instruments, Boston, Mass.). Under the condition of non-electric field, an aqueous drop was pushed from one of the tubes to hit another drop, which was held statically at the tip of another tube until coalescence occurred. The effect of an applied electric field was investigated by preloading aqueous droplets and statically holding them at both capillary tips with the shortest distance between the drops being same for all Examples before an electric field was applied. A high voltage was then applied, using the tubes as electrodes, across the gap between the tubes, to deform the drops to induce drop coalescence. The shortest distance between the drops was measured as a function of applied voltage and the drop coalescence phenomenon was observed by using a high-resolution, high- speed video camera.

Direct-current (DC) electric signals were provided by two adjustable DC power-supply devices, both with built-in galvanometers. The first one, which was an ER/DM DC supply (Glassman High Voltage, Inc., N.J.) with a current limit of 10 mA and an accuracy of ±0.01 mA, was used for systems of low-conductivity aqueous phase. The second, a PS4010-1 DC supply (Sigma-Aldrich, Corp., St. Louis, Mo.) with current limit and measuring accuracy of 300 mA and ±1 mA, respectively, was used for systems of high-conductivity aqueous phase. A CDM3 conductivity meter (The London Company, Denmark) was used to determine the phase-inversion point when no electric field was applied. Under electric fields, the phase-inversion point was judged by the abrupt change in current as well as visual observation of the dispersion color.

The immiscible liquid-liquid systems studied in these Examples are listed in Table 1, along with the important physicochemical properties. Toluene and water were the two major components of all the liquid-liquid systems used. Their physical properties were adjusted by adding other chemicals. The effects of conductivity of the water phase, viscosity of the toluene phase, pH of the water phase, and organic/aqueous interfacial surface tension on the phase inversion were investigated with respect to the applied DC voltage and energy input in terms of agitation speed. The liquid-liquid systems in Table 1 were divided into several groups, with each group having a specific physical property varied by using additives while other important properties were kept essentially unchanged. Examples 1, 2, and 3 were used to study the effects of conductivity; Examples 2, 4, and 5 were used to study the effects of pH; Examples 1, 6, and 7 were used to study the effects of viscosity; and Examples 1 and 8 were used to study the effects of liquid-liquid interfacial surface tension. The following chemicals and materials were used in the present Examples: toluene (>99.9%, J. T. Baker, Phillipsburg, N.J.), isopropanol (>99.9%, J. T. Baker, Phillipsburg, N.J.), mineral oil (Aldrich, Milwaukee, Pa.), NaCl (>99.5%, Fisher Scientific, Nepean, Canada), 0.1 M NaOH solution, 0.1 M HCI solution, and deionized water.

TABLE 1

Physical Properties of the Liquid-Liquid System Examples[a]

| Dispersion No. | Composition | $C_w$ $\mu\Omega^{-1}$ cm$^{-1}$ | $C_t$[b] $\mu\Omega^{-1}$ cm$^{-1}$ | pH | $\mu_w$ cP | $\mu_t$ cP | $\sigma_w$ dyn/cm | $\sigma_t$ dyn/cm | $\sigma_{w/t}$ dyn/cm |
|---|---|---|---|---|---|---|---|---|---|
| 1 | toluene/water | 0.85 | ≈0.00 | — | 0.96 | 0.67 | 74.0 | 30.0 | 31.0 |
| 2 | toluene/water, with NaCl | 35.0 | ≈0.00 | 6.2 | 0.96 | 0.67 | 72.0 | 31.0 | 32.0 |
| 3 | toluene/water, with NaCl | 75.0 | ≈0.00 | — | 0.96 | 0.67 | 72.0 | 30.5 | 32.0 |
| 4 | toluene/water, with HCl | 35.5 | ≈0.00 | 3.2 | 0.95 | 0.65 | 73.0 | 31.0 | 31.0 |
| 5 | toluene/water, with NaOH | 35.0 | ≈0.00 | 10.1 | 0.97 | 0.65 | 73.0 | 29.0 | 31.0 |
| 6 | 820 mL toluene + 900 mL water + 270 mL Min. Oil | 0.95 | ≈0.00 | — | 0.95 | 1.08 | 72.0 | 30.0 | 34.0 |
| 7 | 520 mL toluene + 950 mL water + 470 mL Min. Oil | 0.95 | ≈0.00 | — | 0.99 | 1.86 | 73.0 | 30.0 | 34.0 |
| 8 | 960 mL toluene + 840 mL water + 72 mL isopropanol | 0.80 | ≈0.00 | — | 1.29 | 0.67 | 46.0 | 27.5 | 18.0 |

[a]Values for $\sigma_w$, $\sigma_t$, and $\sigma_{w/t}$ are surface tension of the water phase, surface tension of the toluene phase, and interfacial surface tension of the toluene/water, respectively; $\mu_w$ and $\mu_t$ are viscosities of the aqueous and organic phases; $C_w$ and $C_t$ are conductivities of the water and toluene phases; pH refers to the water phase.
[b]The lowest conductivity measurable by the conductivity meter (COM 2e, The London Company, Denmark) is 0.02 $\mu\Omega^{-1}$ cm$^{-1}$.

All the measurements in this study were performed at room temperature (23° C.) and atmospheric pressure. The experimental procedures for determining the phase-inversion point and the ambivalence region were as follows. A total volume of 1000 mL was consistently maintained for the liquid phase in all the Examples so that a comparison of the results could be readily made. Each Example was started without application of an electric field and with an organic/aqueous volume ratio that produced an O/W condition. The agitation speed was maintained at a constant level. During the Example, approximately 5 mL of aqueous phase was periodically replaced by an equal volume of organic until phase inversion occurred. In terms of organic-phase volume fraction, the experimental error was estimated to be less than 2.5%, based on the lowest organic- or aqueous-phase volume fraction involved in the Example. The period between replacements was much longer than the time needed for phase inversion to occur. The phase-inversion point was determined on the basis of the marked change of the refractive index of the dispersion and the drastic change in conductivity. For Examples under applied voltage, a sudden change of the electric current could be observed when phase inversion occurred because of the large difference in conductivity between the two phases. Phase inversion under electric fields was, therefore, determined by the observation of the drastic change in current. The volume fraction of the organic phase at phase inversion was calculated from the initial volume fraction and the amount of aqueous phase that was replaced with organic during the Example.

After phase inversion occurred, the system was stabilized for 2–5 min and the DC electric signal then turned on at a preset voltage. Within a few seconds, the dispersion status was subsequently reversed from W/O to O/W by the applied electric field. The aqueous phase was further replaced with the organic until phase inversion from O/W to W/O again occurred under the applied voltage.

The phase-inversion point of W/O to O/W was similarly determined by periodically replacing the organic with the aqueous phase. The measurement was first conducted with the electric field on. After phase inversion was observed, the electric field was turned off for the next measurement. When the DC signal was turned off, the dispersion could either return to the W/O state or remain in the O/W status, depending on the conditions of volume fraction, applied voltage, and agitation speed. If the dispersion returned to the W/O status after the DC electric signal was turned off, the phase-inversion point of W/O to O/W without an electric field would be determined by further replacing organic with aqueous liquid. Otherwise, a certain volume of aqueous liquid would be replaced by organic to restore the W/O dispersion before the next measurement.

After the ambivalence region had been determined for a fixed agitation speed (both with and without electric fields), the agitation speed was increased and the preceding procedure was repeated.

Effects of Agitation Speed and Applied Voltage

Figure 4:
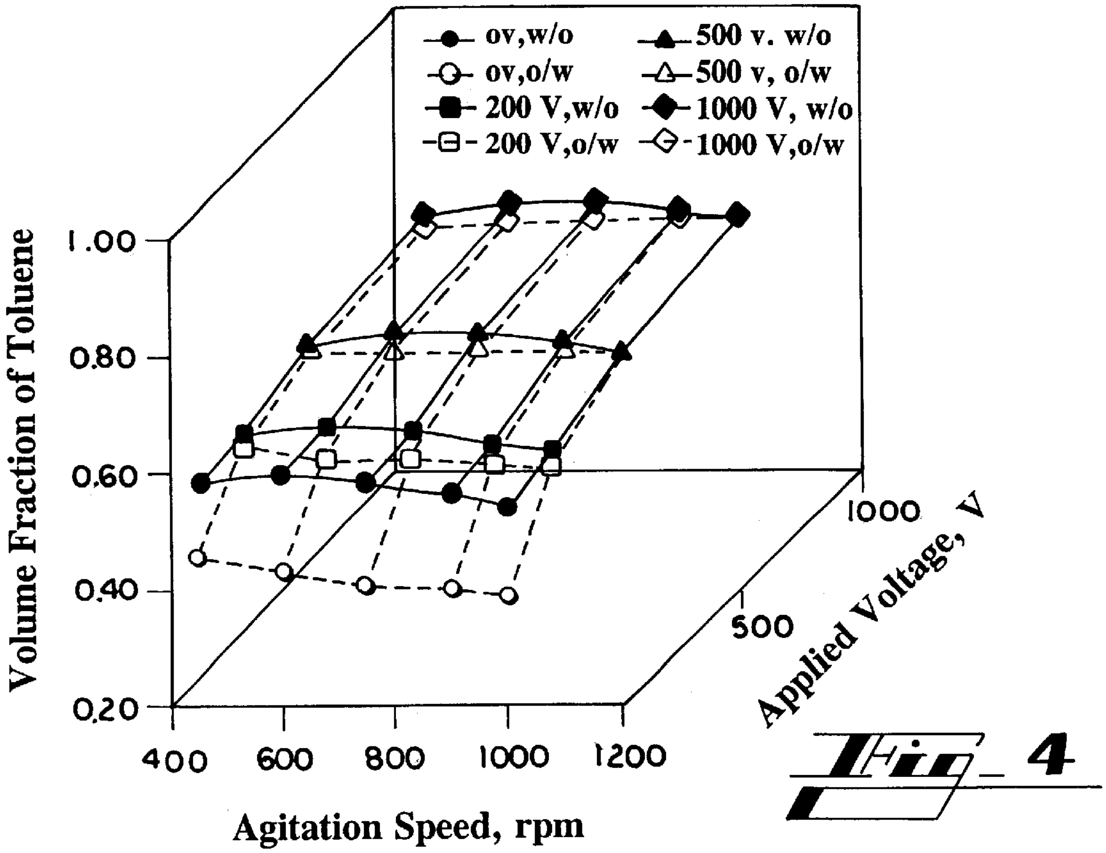
FIG. 4 depicts a three-dimensional graphical representation of phase inversion under electric fields for a toluene/water system.

The ambivalence region was determined for a toluene/water system in a range of applied DC voltage from 0 to 1000 V and agitation speed from 450 to 1000 rpm. FIG. 4 shows a three-dimensional diagram of the ambivalence region. The three coordinate axes are the agitation speed (x-axis), the applied voltage (y-axis), and the volume fraction of organic phase (z-axis), respectively. The ambivalence region is the space between the two surfaces defined by the boundary lines of the ambivalence regime at constant applied voltages. The upper boundary represents phase inversion from O/W to W/O, while the lower boundary represents phase inversion from W/O to O/W.

As shown in FIG. 4, both the W/O-to-O/W and the O/W-to-W/O inversion lines, (i.e., the whole ambivalence region), moved upward, indicating higher toluene volume fractions with increasing applied voltage. This means that under an electric field, a W/O dispersion is inverted to an O/W dispersion at a higher organic-phase volume fraction or a lower aqueous-phase volume fraction. In other words, under an electric field, a smaller population of aqueous drops is needed for the phase to invert, or the drop coalescence rate to increase irreversibly over the breakup rate. This behavior is a result of drop polarization in the presence of the electric field, which leads to a higher coalescence rate of the aqueous droplets. Similarly, under an electric field, an O/W dispersion is inverted to a W/O dispersion at a higher organic-phase volume fraction, because an aqueous continuous phase conducts much higher electric current than an organic continuous phase. Thus, under an electric field, the aqueous phase is favored to be the continuous phase and resists inversion. As a result, a higher volume fraction of organic droplets is needed for the inversion to occur.

Figure 5:
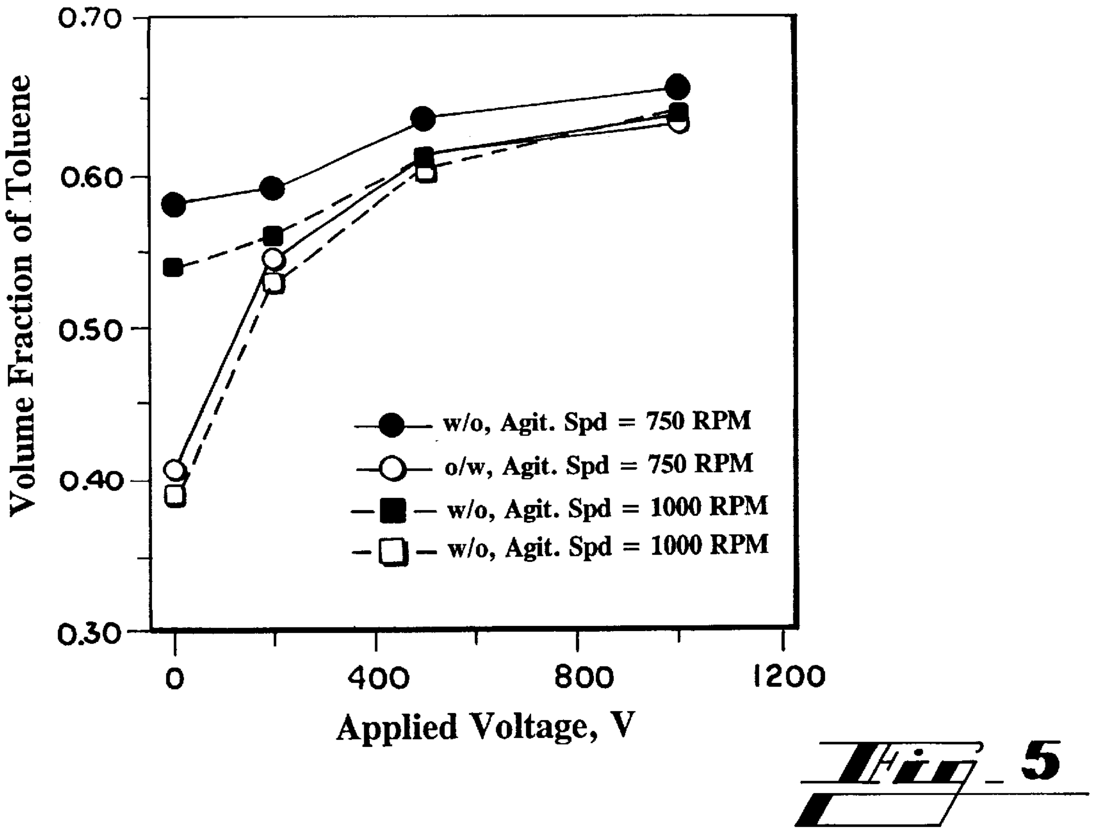
FIG. 5 depicts a graphical representation of the relationship between the ambivalence region and the applied voltage for a toluene/water system at constant agitation.

The effects of applied electric fields on the ambivalence region at constant agitation speeds are illustrated in FIG. 5. It is clear that as the applied voltage is increased, the ambivalence region narrows and the two boundaries approach one other. FIG. 5 also shows how you can use an electric field to increase the volume fraction of a dispersed organic without causing phase inversion. For example, at a constant agitation speed, only when the toluene volume fraction is less than 41%, the organic-in-water dispersion can be ensured (below the ambivalence region) without an applied voltage. However, the organic-in-water dispersion can be ensured with a volume fraction of toluene less than 54% under an applied voltage of 200 V (DC), with a volume fraction of toluene less than 61% under an applied voltage of 500 V (DC), and with a volume fraction of toluene less than 63% under an applied voltage of 1000 V (DC). Therefore, with an applied electric field, one can increase the organic volume fraction in an organic-in-water dispersion without causing phase inversion to water-in-organic.

Figure 6:
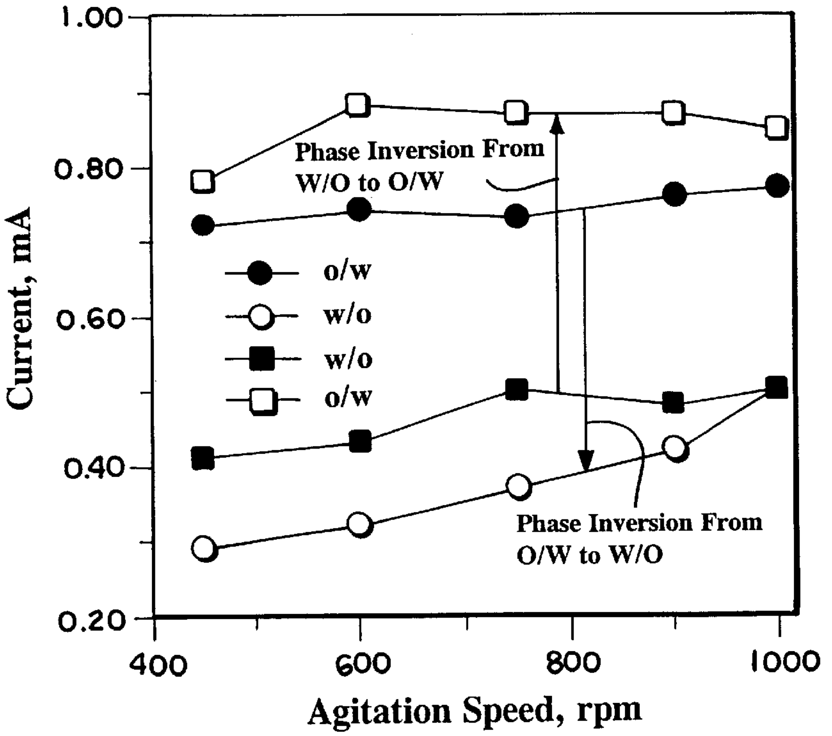
FIG. 6 depicts a graphical representation of the electric current before and after phase inversion in two different experiments on a toluene/water system.

The electric current before and after phase inversion is shown in FIG. 6 for two different situations at 500V. The current sharply increased when the dispersion inverted from W/O to O/W and drastically dropped when phase inversion from O/W to W/O occurred. These changes were observed because the conductivity of the aqueous phase was much higher than that of the organic phase.

Figure 7:
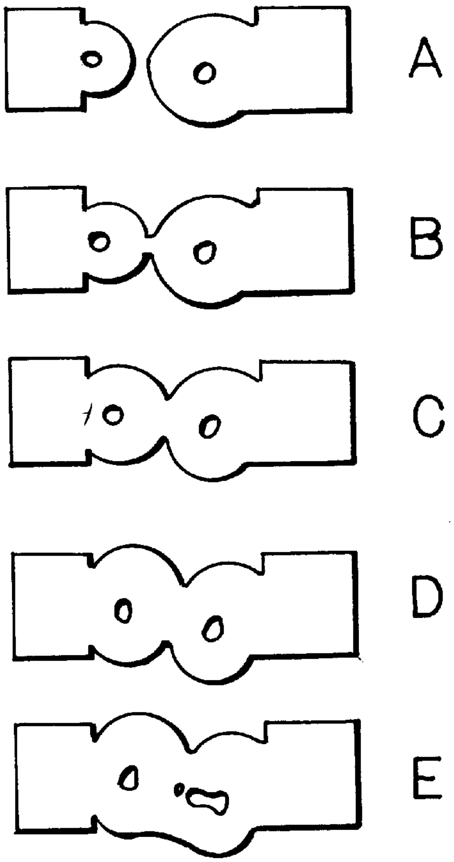
FIG. 7 shows pair-drop coalescence for a toluene/water system in the absence of an applied electric field.
Figure 8:
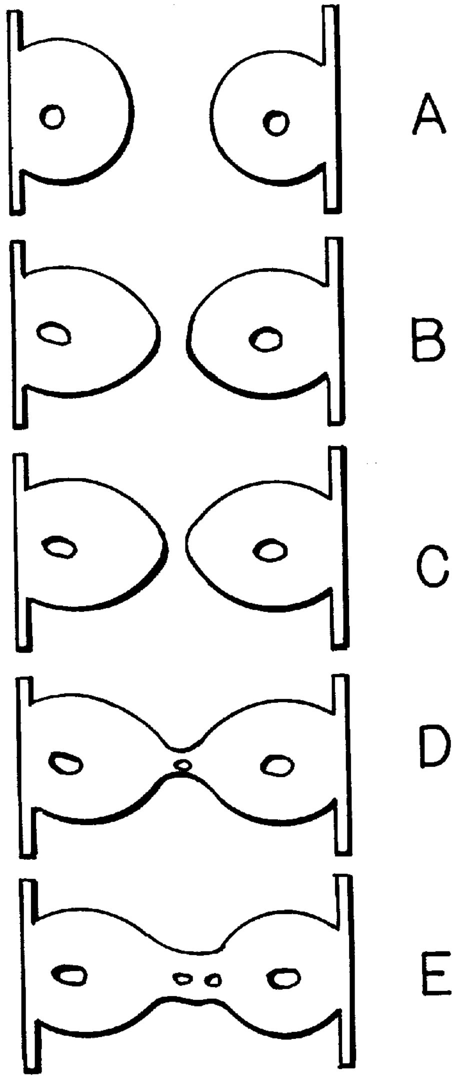
FIG. 8 shows pair-drop coalescence for a toluene/water system under an applied DC voltage of 1 kV.

To demonstrate the mechanism of the electric-field-enhanced aqueous drop coalescence, pair-drop-coalescence Examples were performed using toluene as the surrounding phase and water droplets. The two liquids were at equilibrium prior to each Example, so that no mass transfer occurred during the Example. In the absence of an electric field, an aqueous drop was injected through one of the capillaries towards a second drop that was held at the tip of the opposing capillary. A series of pictures were taken during the collision and coalescence of the drops. As shown in FIG. 7, the two drops contacted and pressed each other physically to make the coalescence happen. Before coalescence, the two drops experienced notable deformation during which the organic film between the two drops is squeezed and drained out. The effect of an applied electric field on drop coalescence is shown in FIG. 8 where two aqueous droplets were held statically with a distance of 1.13-mm separating them before the voltage was turned on. Then a 1-kV DC voltage was applied and the interaction of the drops was observed using the high-speed camera. The history of drop deformation, elongation, and coalescence is shown in FIG. 8. It is shown clearly that the drops were polarized and elongated along the direction of electric field. The two drops coalesced as soon as they came into contact with one other because the adjacent poles were oppositely charged due to the polarization effect. Also, once the field was turned on, coalescence occurred very rapidly within a few milliseconds, even when the drops were far apart from each other. The conclusion of these experiments is that application of an electric field on a water-in-organic dispersion enhances both collision frequency and collision efficiency. Thus the coalescence rate, which is the product of collision frequency and collision efficiency, is enhanced significantly. Under a strong enough electric field, the drop coalescence rate becomes much larger than the breakup rate, leading to a phase inversion.

Effect of the Conductivity of the Water Phase

Figure 9A:
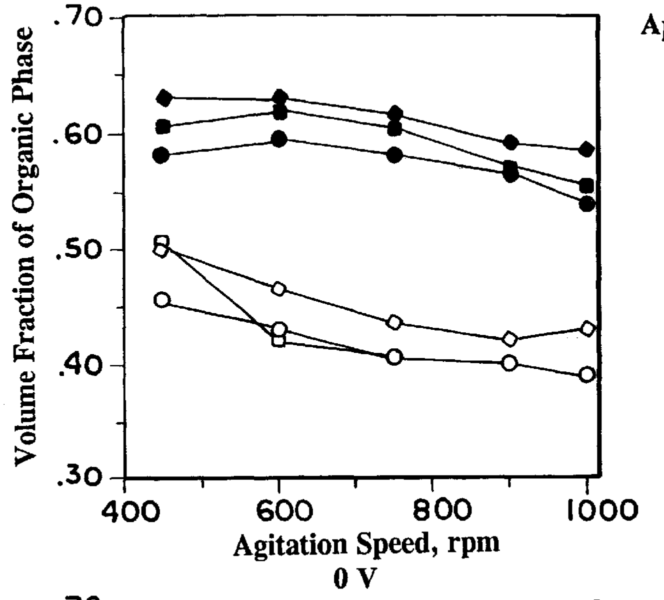
FIGS. 9*a–c* depict graphical representations of the effect of conductivity of the aqueous phase on the ambivalence region under different electric fields.

The effect of aqueous-phase conductivity on phase-inversion was studied using Examples 1, 2, and 3 of Table 1. The conductivity of the aqueous phase was adjusted by adding small quantities of 1 M NaCl solution. The aqueous phases in Examples 1, 2, and 3 had NaCl concentrations of 0.0, 0.0004 and 0.001 M, respectively, which led to corresponding conductivity values of 0.85, 35.0, and 75.0 $\mu\Omega^{-1}cm^{-1}$. No significant changes in other physicochemical properties were caused by the addition of the very small amount of NaCl solution as shown in Table 1. Results of the phase-inversion Examples are presented in FIG. 9. When no electric field was applied, the phase-inversion behavior was not affected significantly by varying the conductivity. The ambivalence region, however, shifted slightly toward higher toluene volume fractions with increasing conductivity of water, as shown in FIG. 9*a*. This shift was probably caused by changes in the surface charge due to the addition of very small amounts of $Na^+$ and $Cl^-$ ions.

Figure 9B:
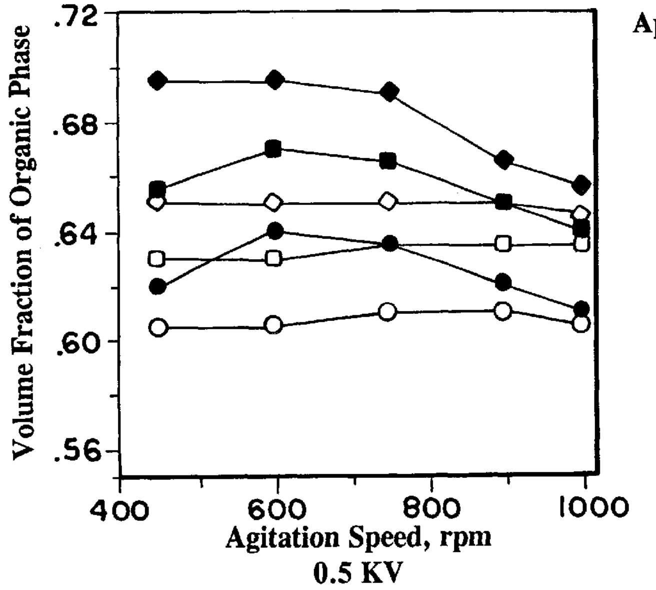
Figure 9C:
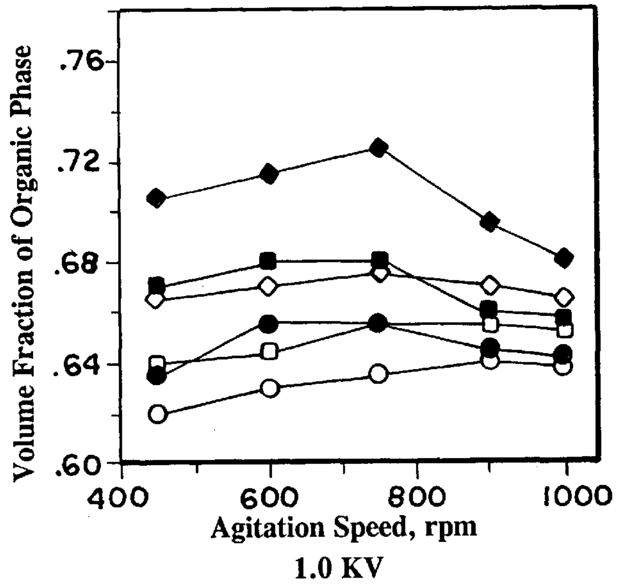

For all three Examples, the ambivalence region shifted upward under an applied electric field. However, the effect of the applied voltage was found to depend on the aqueous-phase conductivity. Under the same applied voltage, the ambivalence regions of the systems with higher conductivities became narrower and shifted toward higher volume fractions of the organic phase more rapidly than those with lower conductivities, as shown in FIGS. 9*b* and *c*.

It has been reported in the literature (Howarth, 1967) that increasing the ionic strength inhibits the coalescence of organic drops dispersed in the aqueous phase when the ionic strength is very low. However, when the ionic strength is high, such an increase enhances the coalescence of organic drops, because the ions reduce the thickness of the electrical double layer surrounding the drops (Tobin and Ramkrishna, 1992). In this study, the conductivity was adjusted by adding NaCl solution; therefore, the upper boundary of the ambivalence region (O/W to W/O) shifted upward because of the increase in conductivity.

Figure 10A:
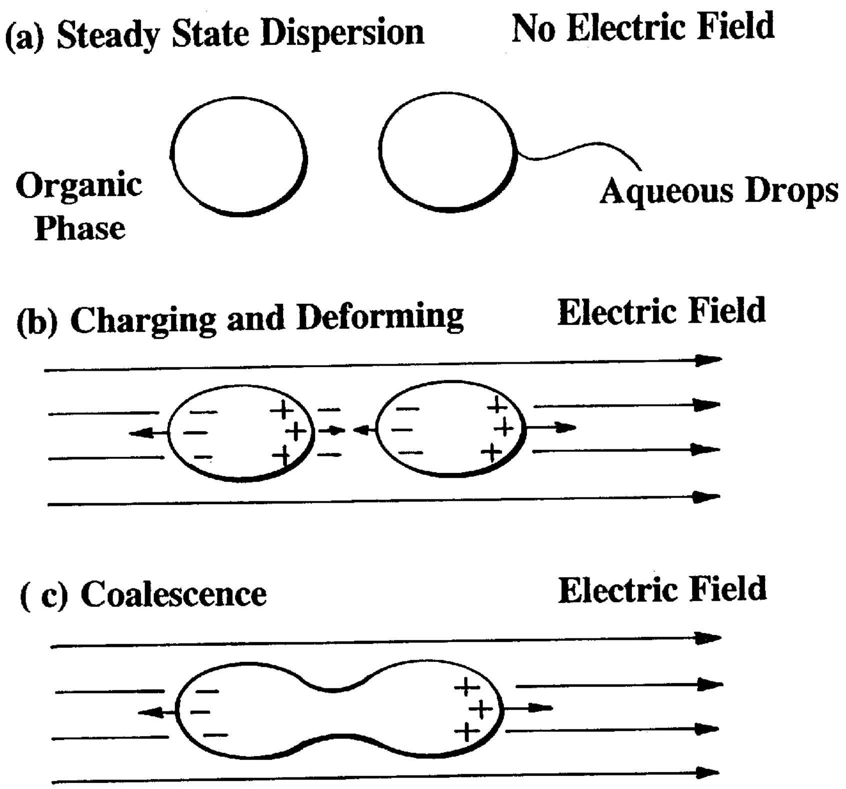
FIG. 10 depicts a schematic representation of the effect of applied electric fields on the coalescence of aqueous drops in an organic phase.
Figure 10B:
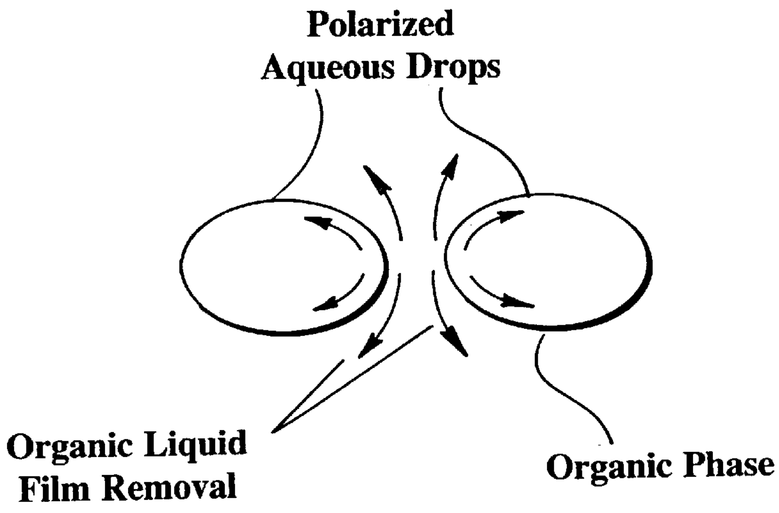

When an electric field is applied, an increase in conductivity enhances coalescence of the aqueous drops, which may lead to phase inversion from W/O to O/W. If the aqueous phase is continuous, application of an electric field helps to maintain this condition. The reason for this behavior is that aqueous drops are polarized in an electric field resulting in higher coalescence rates, as illustrated in FIG. 10*a*. Higher conductivity also facilitates the circulation inside the aqueous droplet (Usami et al., 1993), as shown in FIG. 10*b*, which helps the removal of the organic-phase film from the space between two aqueous droplets, leading to coalescence.

Effect of pH

Examples 2, 4, and 5 in Table 1 were prepared with varied pH values of the aqueous phases. The pH values of Examples 4 and 5 were adjusted by continuously adding 0.1 M HC1 and 0.1 M NaOH solution, respectively, until the conductivity of the water phase reached the level of Example 2, which contained 0.0004 M NaCl and had a conductivity of 35.0 $\mu\Omega^{-}cm^{-}$. The pH values of Examples 2, 4, and 5 were 6.20, 3.22, and 10.1, respectively. Results of the phase inversion for these Examples are presented in FIGS. 11*a, b*, and *c* for applied voltages of 0V, 500V, and 1 kV, respectively.

Figure 11A:
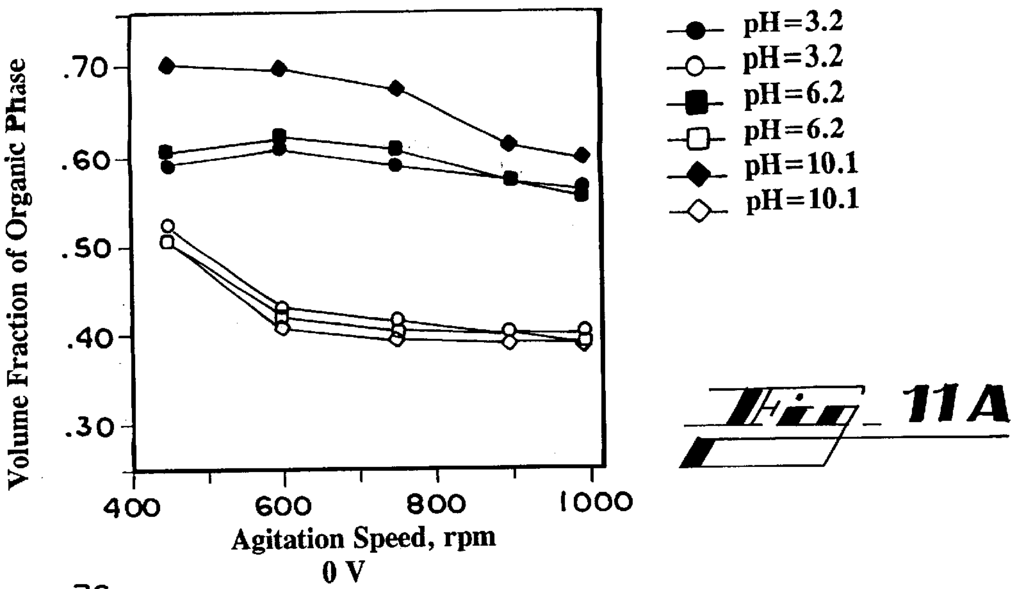
FIGS. 11*a–c* depict graphical representations of the effect of aqueous phase pH on the ambivalence region under different electric fields.
Figure 11B:
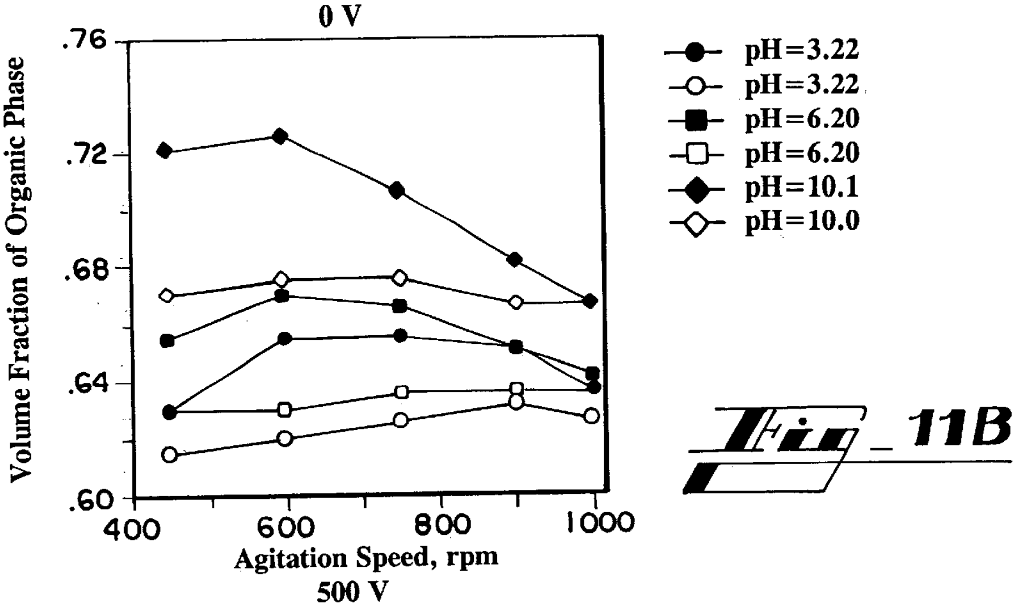
Figure 11C:
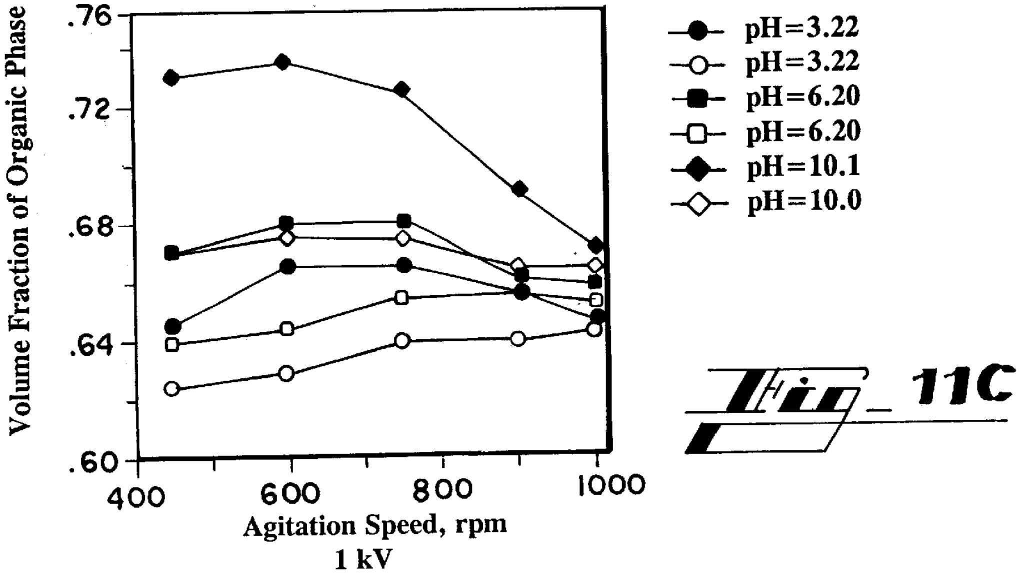

When no electric field was applied, the lower boundary of the ambivalence, which represents phase inversion from W/O to O/W, was not significantly affected by the pH. However the upper boundary, which is the phase-inversion line from O/W to W/O, was moved upward, indicating a higher organic-phase volume fraction with the increase in pH. FIG. 11*a* indicates that the upper boundary was more sensitive to alkaline. conditions than to acidic. Under electric fields, the effects of the pH on the ambivalence behavior were magnified. As shown in FIGS. 11*b* and *c*, at the same applied voltage, the ambivalence region became wider and shifted upward more rapidly for the Example with the highest pH value.

Tobin and Ramkrishna (1992) demonstrated that an increase in the aqueous-phase pH could significantly stabilize the O/W dispersion due to the preferential adsorption of hydroxide ions on the surface of the organic drops. The adsorbed $OH^-$ ions create a negatively charged layer that provides coulombic repulsive forces that keep the organic drops away from one other. Our experimental results concerning the pH effect agree with this theory. In the absence of applied electric fields, the upper boundary of the ambivalence region shifted upward as the pH was increased. Such an effect is more pronounced for the high-pH system (obtained by adding NaOH solution) than for the low-pH system (obtained by adding HCI solution), because the former provides a higher concentration of OH ions. The lower boundary of the ambivalence regime for the no-field Examples (FIG. 11*a*) was barely affected by varying the pH when the conductivity was kept constant, because the charge density on the external surface of the aqueous drops is insignificant.

Under electric fields, the ambivalence regime of all three Examples was narrowed and shifted upward, indicating higher organic volume fractions. However, the ambivalence region of liquid-liquid systems with higher pH values shifted more rapidly than those with lower pH values. The upper boundary of the ambivalence region, which represents phase inversion from O/W to W/O, moves upward as the pH is increased because the organic droplets have higher charge density at higher pH values. Higher charge results in higher repulsive force among droplets, therefore, a higher volume fraction of the dispersed phase is needed for phase inversion to occur. The lower boundary of the ambivalence region, which represents phase inversion from W/O to O/W, also moves upward to higher organic-phase volume fraction as the pH is increased. This behavior was observed only in the presence of an applied electric field, which suggests that under this condition, aqueous droplets coalesce at a higher rate as the pH is increased. A probable reason for this phenomenon is higher polarizability of aqueous droplets at higher pH values.

Effect of Viscosity

Figure 12A:
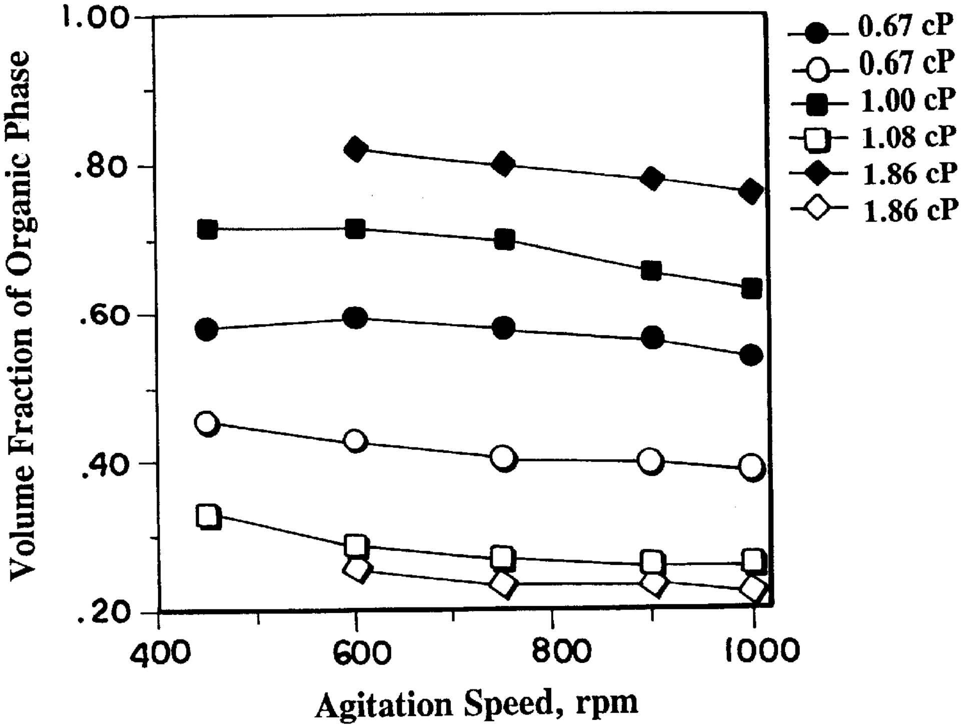
FIGS. 12*a–b* depict graphical representations of the effect of organic phase viscosity on the ambivalence region under different electric fields.
Figure 12B:
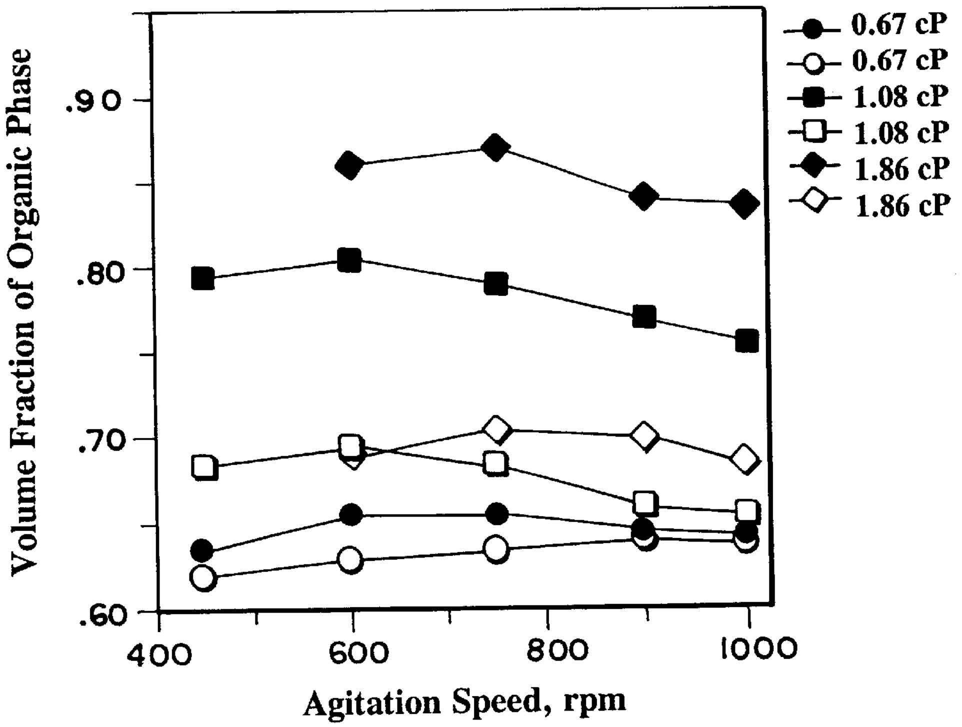

The effect of viscosity of the organic phase was studied using Examples 1, 6, and 7 of Table 1, which had organic-phase viscosities of 0.67, 1.08, and 1.86 cP, respectively. The viscosity of Examples 6 and 7 was adjusted by adding mineral oil. As shown in FIG. 12*a*, an increase in the viscosity of the organic phase widened the ambivalence regime. The upper boundary shifted upward, while the lower boundary shifted downward simultaneously. FIG. 12*b* shows the results obtained under an applied voltage of 1 kV. The ambivalence region again narrowed and shifted upward to higher organic-phase volume fractions, as compared with the no-field Examples of FIG. 11*a*. The Examples with higher viscosities shifted more rapidly than those with lower viscosities, and the order of the lower boundaries was reversed under the applied voltage.

When no electric field was applied, the effect of the organic-phase viscosity on the ambivalence region observed here is similar to that of the aqueous-phase viscosity found in a previous study (Norato et al., 1998). It is known that the liquid film of the continuous phase must be drained from the space between two approaching drops for a collision to result in coalescence. The surfaces of the colliding drops move as a result of the shear force against the surrounding liquid, which can further facilitate removal of the liquid between the drops (FIG. 10*b*). When the viscosity of the continuous phase is increased, the removal rate of the liquid film between two drops decreases, thus, drop coalescence is inhibited. When the viscosity of the dispersed phase is increased, the interfacial motion of the colliding drops is reduced, which also results in inhibition of coalescence. Therefore, increasing the viscosity of either the organic or the aqueous phase leads to a broadening of the ambivalence regime, with the upper boundary moving upward and the lower boundary moving downward simultaneously. Under electric fields, shifting of the upper boundary of the ambivalence region was observed, similar to the behavior discussed previously. However, applying a voltage of 1 kV reversed the order of the lower boundaries of the ambivalence. This may be explained as the result of the two competing trends: (i) the ambivalence region becoming narrow and moving upward to higher organic-phase volume fractions under an electric field and (ii) the ambivalence region becoming wide as the organic phase viscosity is increased. Under these trends, the upper boundary of the ambivalence region shifts to higher values of the organic-phase volume fractions, while the lower boundary moves to lower values with increasing organic-phase viscosity and to higher values with increasing applied voltage. At 1 kV applied voltage, the effect of the electric field is apparently stronger than the effect of the viscosity; thus, a reversal in the order of the lower boundaries occurs, as shown in FIG. 12*b*.

Effect of Interfacial Surface Tension

Figure 13A:
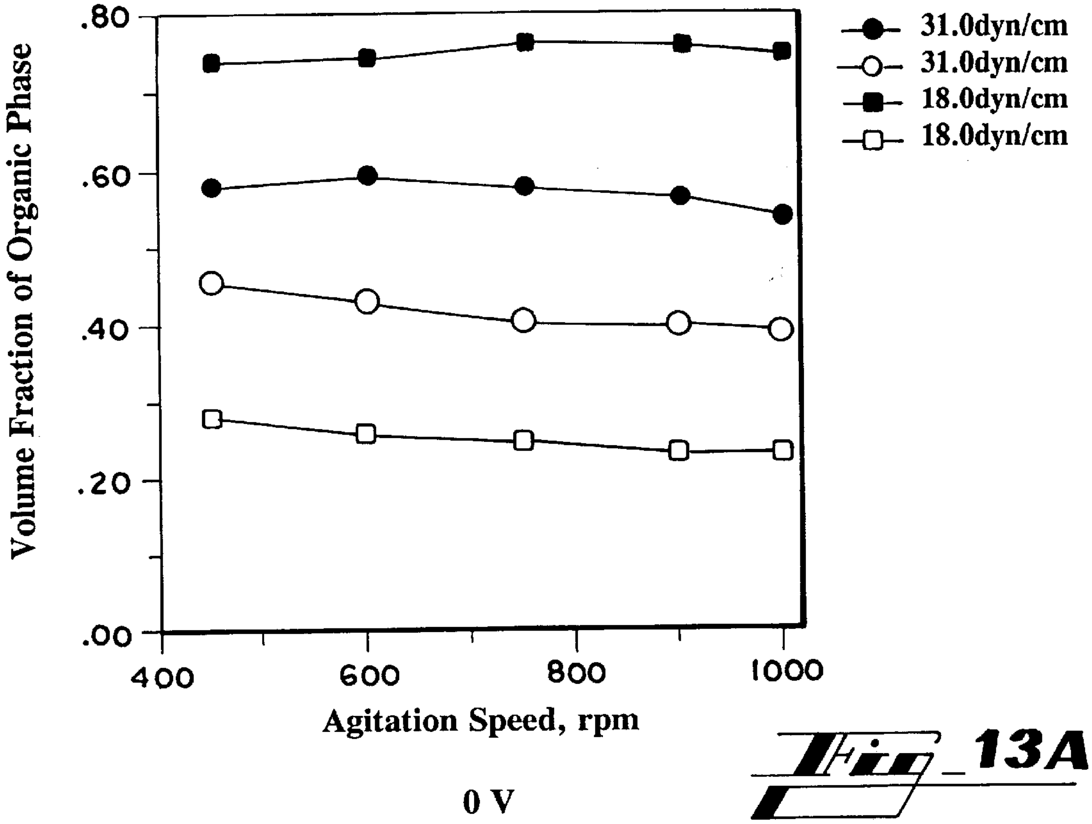
FIGS. 13*a–b* depict graphical representations of the effect of interfacial tension on phase inversion under different electric fields.
Figure 13B:
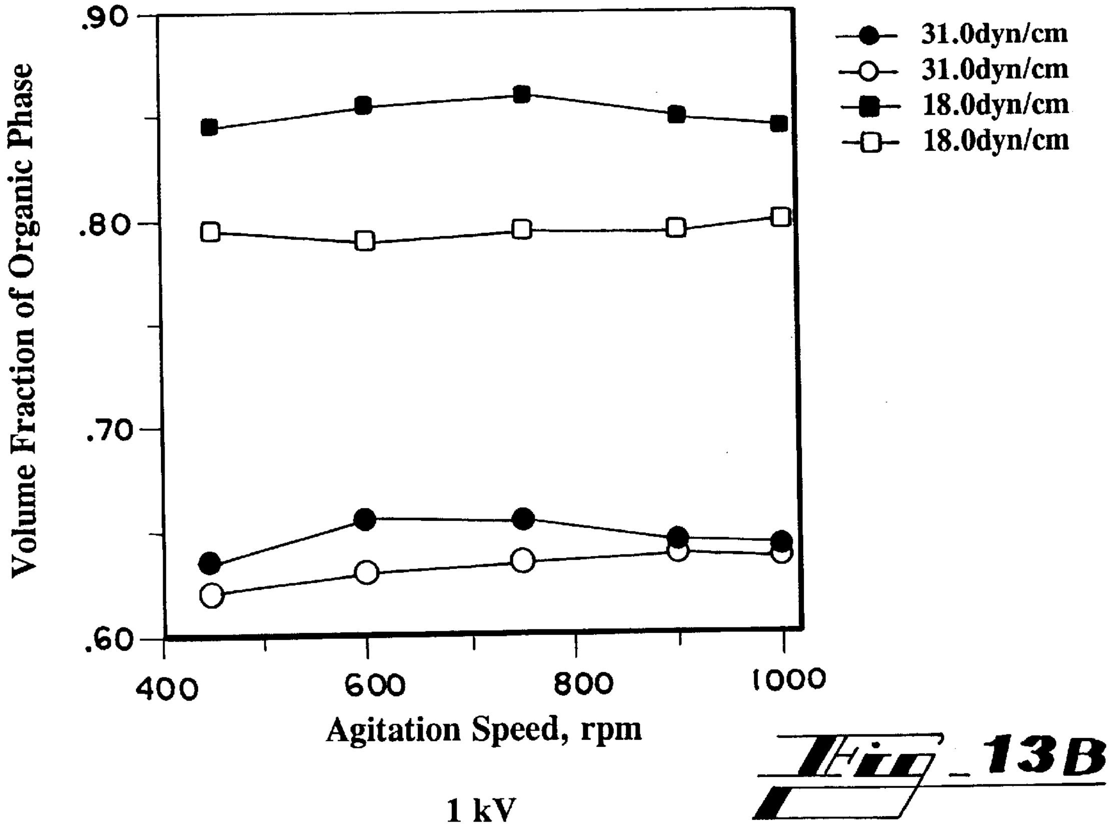

The effect of interfacial tension was studied using Examples 1 and 8 in Table 1, which had interfacial tension values of 31.0 and 18.0 dyne/cm, respectively. FIG. 13*a* shows that the ambivalence region was widened by decreasing the interfacial tension, with the upper boundary moving upward and the lower boundary moving downward. There was no applied voltage used in these experiments. Under applied voltage of 1 kV, as shown in FIG. 13*b*, the ambivalence region was narrowed and shifted upward. The ambivalence region of the system with lower interfacial tension was shifted upward more rapidly than that of the system with higher interfacial tension.

Figure 14:
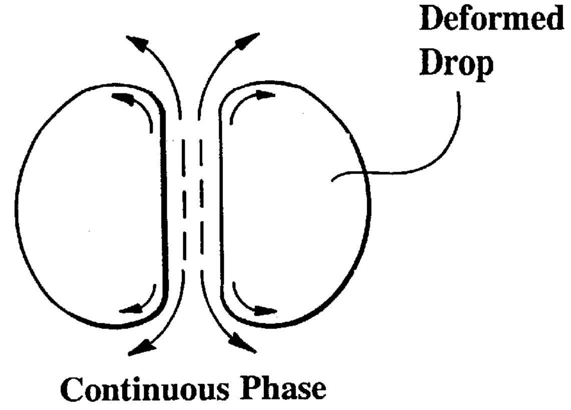
FIG. 14 shows inhibited liquid-film removal between deformed drops.

Without applied electric fields, a low interfacial tension favors drop breakup, which leads to the formation of smaller daughter drops regardless of which phase is dispersed (Coulaloglou and Tavlarides, 1977; Tsouris and Tavlarides, 1994). A decrease in the interfacial tension has opposite effects on drop coalescence. Lowering the interfacial tension, on the one hand, may facilitate the movement of the drop surface, which assists in removal of liquid film from the space between two approaching drops and thus enhances drop coalescence. On the other hand, at lower interfacial tension, the colliding drops can be deformed, as illustrated in FIG. 14. Such a deformation of the drops increases the resistance to squeezing the liquid film from the interdrop space and thus inhibits drop coalescence. Results of this Example indicate that lowering the interfacial tension has an overall effect of reducing the drop coalescence rate, which results in a broader ambivalence region with the upper boundary shifting upward and the lower boundary shifting downward. This behavior is correctly represented by the coalescence rate function derived by Coulaloglou and Tavlarides (1977).

When an electric field is applied, the aqueous drops are polarized and elongated into elliptical shapes with their poles attracting one other due to the coulombic force, as illustrated in FIGS. 8 and 10*a*. Such effects of polarization and elongation under electric fields prevent the drop deformation described in FIG. 14. Lowering the interfacial tension favors drop elongation under electric fields, similar to that shown in FIG. 8, which enhances the collision and coalescence rates of the drops. Under this condition, the upper boundary of the ambivalence, representing phase inversion from O/W to O/W, shifts to higher organic-phase volume fractions for two reasons: (i) the applied voltage, which favors the aqueous phase being the continuous, and (ii) the lower interfacial tension, which inhibits the coalescence rate and enhances the breakup rate of the organic droplets. The lower boundary of the ambivalence region also moves to higher organic-phase volume fractions for the same reasons. (i) The applied voltage enhances the coalescence rate of aqueous droplets; thus, inversion occurs at a lower volume fraction of the aqueous phase (or a higher volume fraction of the organic phase). (ii) The lower interfacial surface tension favors deformation and coalescence of the aqueous drops. As a result, a more rapid shift of the ambivalence region occurs when the interfacial tension is decreased.

Figure 15:
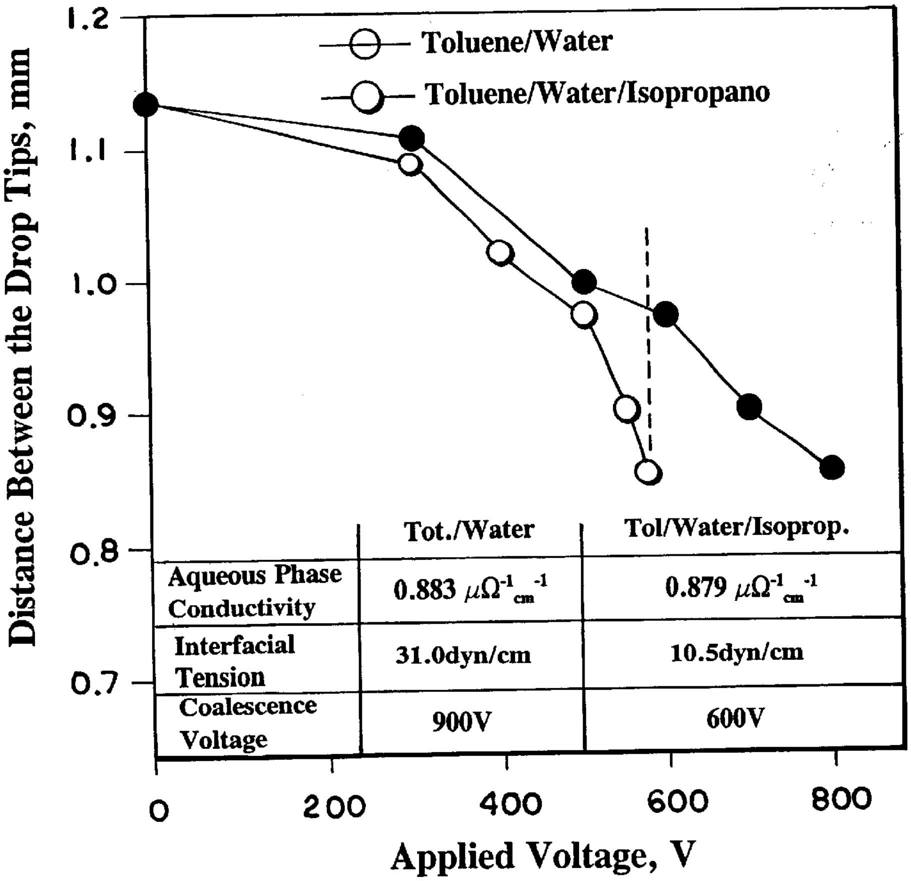
FIG. 15 depicts a graphical representation of pair-drop interaction under applied electric field for systems with different interfacial tensions.

The effect of interfacial tension on the coalescence of two drops under electric fields was investigated for the toluene/water system. The interfacial surface tension was modified by adding a small amount of isopropanol while other important properties were essentially maintained constant. The experimental procedure was the same as described previously. Two aqueous drops were first loaded at the tips of the capillary tubes with a distance of 1.13 mm between the adjacent poles. The applied voltage was increased from zero to the level at which the drops coalesced and the distance between the two poles was measured under different applied voltages. As shown in FIG. 15, under the same applied voltage, the distance between the drop poles was shorter for the lower interfacial tension system. In addition, drops coalesced at a lower applied voltage in the system with the lower interfacial tension. These observations indicate that lowering interfacial tension facilitates aqueous- drop coalescence in an organic phase in the presence of an applied electric field because the drops with lower interfacial tension can be deformed and elongated more readily under an applied electric field.

These Examples demonstrate that not only fluid mechanics, but also surface chemistry are important in drop coalescence. These results provide the means for better control of which phase of a dispersion is the dispersed and which is the continuous. Moreover, by inducing a cycle of phase inversions, one may enhance the mass transfer between the two phases.

Example 9

In this Example, the Omni-culture bench-top fermentor used in Examples 1–8 was used to show whether an AC signal could achieve the same results.

An alternating-current (AC electric signal was provided by an adjustable AC power supply with a built-in galvanometer. The current limit of the AC power supply was 150 mA. The power supply was automatically shut down when the current exceeded the limit.

The immiscible liquid-liquid system used in this study was composed of deionized water and pure toluene (>99.9%, Aldrich). Table 2 gives the physical properties of the two components and the liquid-liquid system.

TABLE 2

Physical Properties of the Toluene/Water System at 23° C.

| | | |
|---|---|---|
| Density | Water | 1.00 g/cm$^3$ |
| | Toluene | 0.865 g/cm$^3$ |
| Conductivity | Water | 0.35 $\mu\Omega^{-1}cm^{-1}$ |
| | Toluene | 2.5 $n\Omega^{-1}cm^{-1}$ |
| Surface | Water | 30.0 dyn/cm |
| Tension | Toluene | 74.0 dyn/cm |
| Interfacial Tension | Toluene/Water | 31.5 dyn/cm |
| Viscosity | Water | 1.0 cP |
| | Toluene | 0.6 cP |

All the measurements in this study were performed at room temperature (23° C.) and atmospheric pressure. A liquid replacement method similar to that previously described by Norato et al. (1998) was used to determine the phase inversion point and the ambivalence region. A total volume of 1000 mL of the liquid was consistently maintained throughout each Example so that a comparison of the results could be readily made. Each Example was started without applying an electric field and with a toluene/water ratio for which toluene was dispersed in water (O/W). The agitation speed was maintained at a constant level throughout the Examples. During the Examples, approximately 5 mL of water was periodically replaced by an equal volume of toluene until phase inversion occurred. The waiting period between replacements was approximately 5 min, which for the system used here was much longer than the time needed for phase inversion to occur. The phase inversion point was determined on the basis of visual observation of the marked change of the refractive index of the dispersion. For Example with an applied voltage, a sudden change of the electric current was observed, which can also be used for the detection of phase inversion. The volume fraction of toluene at phase inversion was calculated from the initial volume fraction and the amount of water that was replaced with toluene during the Example.

After phase inversion had been reached, the system was stabilized for 2 minutes and then the AC electric signal was turned on at a preset voltage. The dispersion status was subsequently reversed from W/O to O/W by the applied electric field within a few seconds. Water was further replaced with toluene until phase inversion from O/W to W/O occurred under the applied-voltage conditions.

The phase inversion point of W/O to O/W was similarly determined by periodically replacing toluene with water. The measurement was first conducted with the electric field on. After phase inversion was observed, the electric field was turned off for the next measurement. The dispersion either returned to the W/O status or remained in the O/W status when the AC signal was turned off, depending on the previous conditions of volume fraction, applied voltage, and agitation speed. If the dispersion returned to the W/O status after the AC electric signal was turned off, the phase inversion point without an electric field would be determined by further replacing toluene with water. Otherwise, a specified volume of water had to be replaced by toluene to restore the W/O dispersion before the next measurement.

After the ambivalence region had been determined at a fixed agitation speed, both with and without electric fields, the agitation speed was increased to a higher level and the measurements were repeated.

Figure 16:
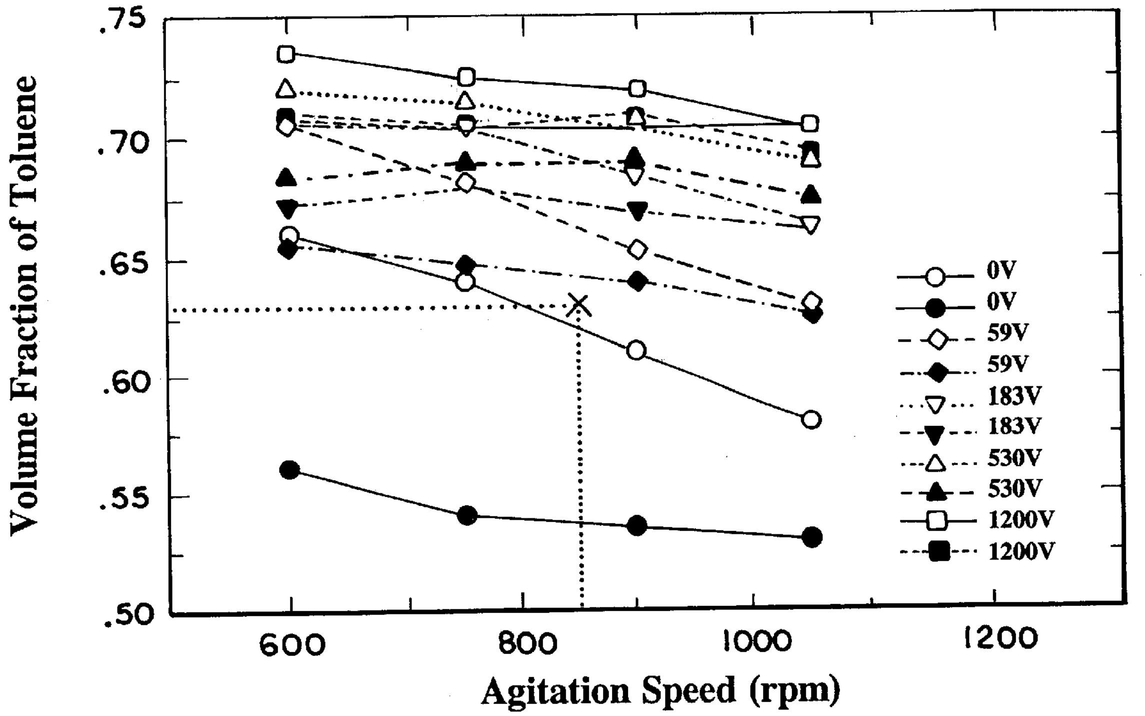
FIG. 16 depicts a graphical representation of the effects of electric fields on the ambivalence region for a toluene/water system.

Ambivalence regions were determined throughout the range of 0 to 1.2 kV applied AC voltage, which was the maximum value obtainable under the electric current limit of the power supply. FIG. 16 shows the effects of the applied AC electric signal on the ambivalence behavior. The ambivalence region was shifted toward higher values of the toluene volume fraction and became narrower as the applied voltage was increased. FIG. 16 also indicates that at a fixed toluene volume fraction, higher voltages are needed to effect inversion from W/O to O/W when higher agitation speeds are used. As indicated by the line A-B-C in FIG. 16, at a toluene volume fraction of 0.705, W/O to O/W inversions were obtained with applied voltages of 183, 530, and 1200 V when agitation speeds of 750, 900, and 1050 RPM, respectively, were used.

Another important observation that can be made from FIG. 16 is that the ambivalence regions in the presence of an electric field are above the 0-V region. This behavior has the following implication. Consider, for example, the two ambivalence regions of 0 V and 59 V. If the toluene volume fraction is 0.63 and the agitation speed is 850 RPM, then at 0 V, this point is above the ambivalence region; hence the dispersion is W/O. By turning on the electric signal, however, the same point will be below the ambivalence region; thus the dispersion will be O/W. This means that by turning the voltage on and off, one can control which phase is dispersed and which is continuous and therefore induce consecutive phase inversions that will enhance mixing and interfacial mass transfer.

Finally, FIG. 16 also shows how the present invention may be used to correct a phase inversion without having to shut down the process. For example, if an originally organic-in-water dispersion is inverted to a water-in-organic dispersion by accident, the dispersion can be resumed to the organic-in-water by applying an electric field. If the accidental phase inversion (from organic-in-water to water-in-organic) happens in the ambivalence region, the dispersion of organic-in-water (after being corrected) will be retained even after removal of the electric field.

Figure 17A:
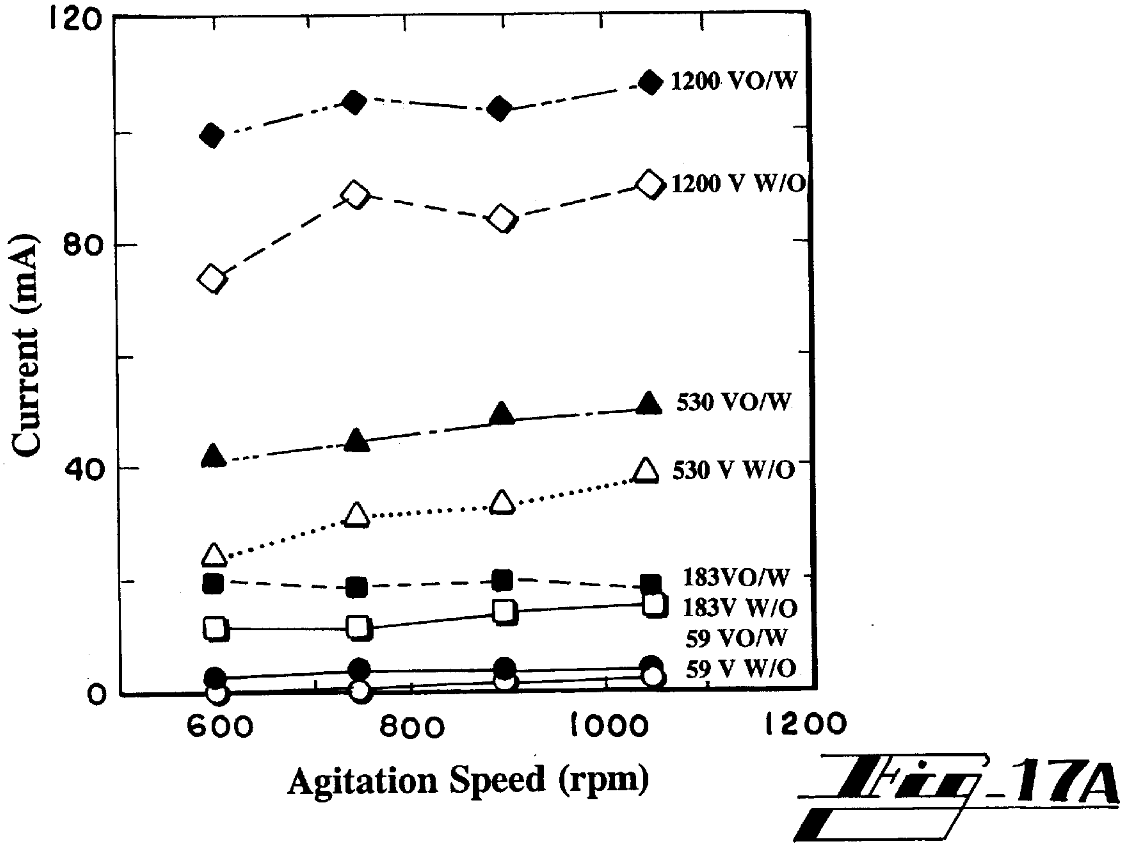
FIGS. 17*a–b* are graphical representations of current measurements in relation to agitation and applied voltage for a toluene/water system.
Figure 17B:
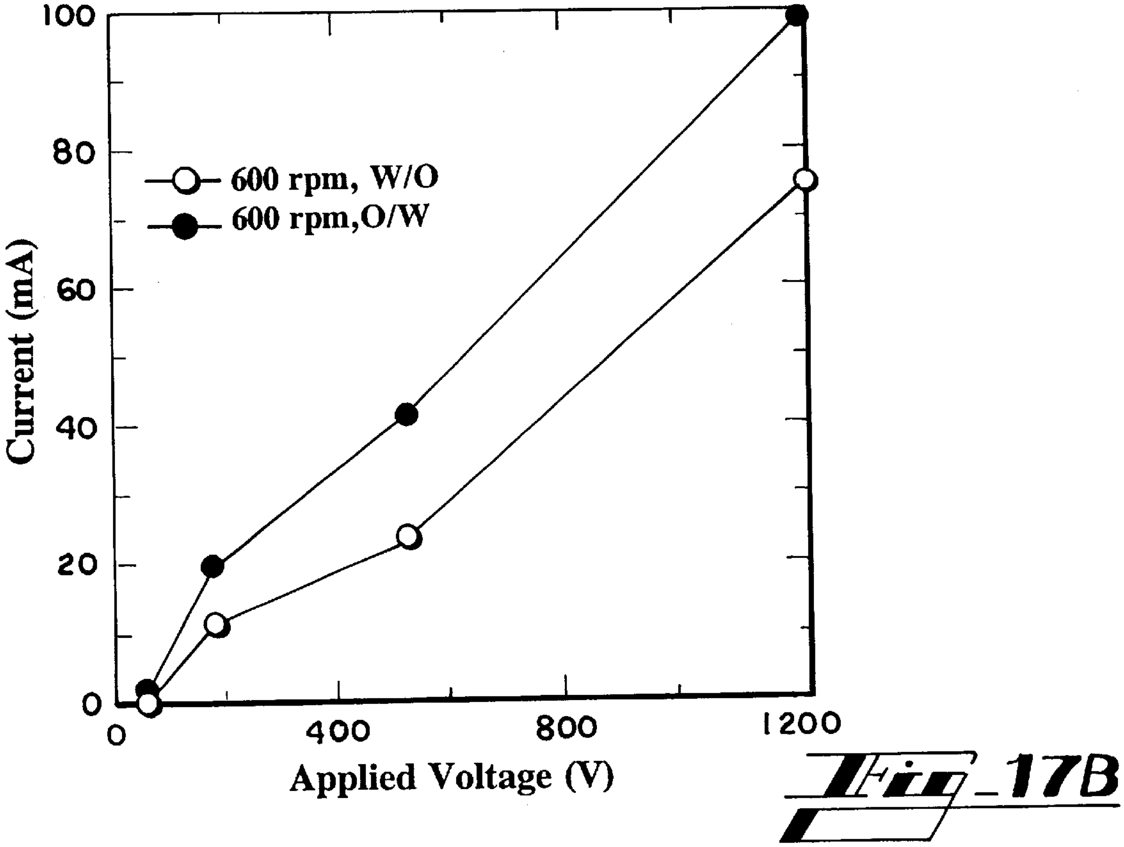

FIGS. 17*a* and *b* show the electrical current values before and after phase inversions. Since the electrical conductivity of water is much higher than that of toluene, a sudden increase of current was observed when the dispersion was converted from W/O to O/W. Therefore, current measurements can be used as a means of detecting which phase is dispersed and which is continuous.

The mechanism of drop coalescence under the influence of an electric field, as described above, indicates that the application of electric fields should always work to change W/O to O/W and not the reverse. However, as demonstrated by the Examples in this work, once a dispersion of O/W has been obtained by applying an electric field, turning off the field may change the dispersion to W/O.

Example 10

Figure 18:
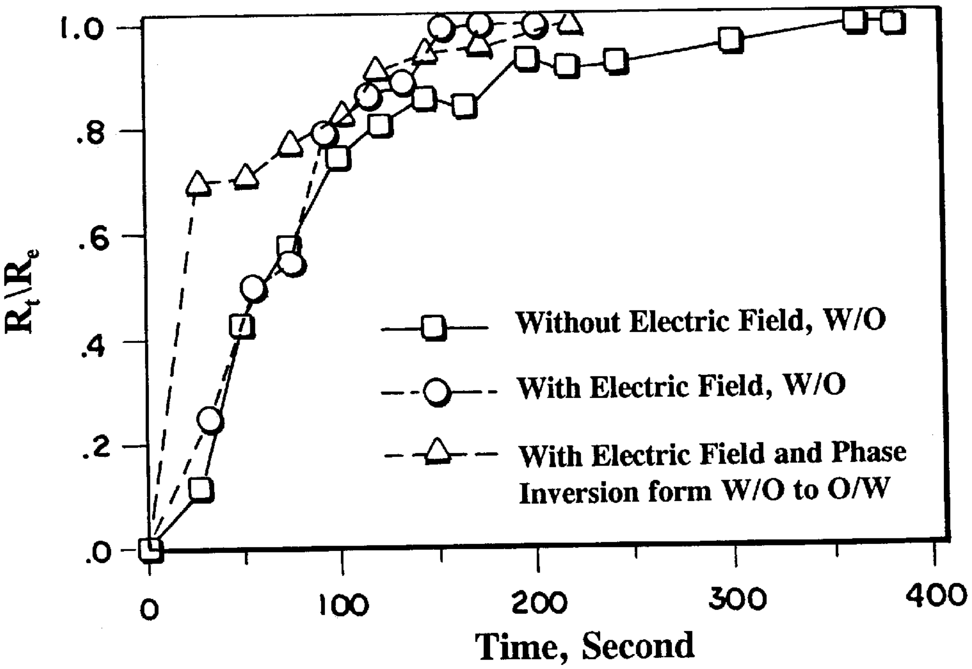
FIG. 18 depicts a graphical representation of the relationship between phase inversion and mass transfer.

In this Example, n-octanol was used to extract isopropanol from a binary mixture of isopropanol and water. FIG. 18 gives the results of this Example. The same agitation speed of 350 RPM was used for this Example. Three operating conditions, A, B, an d C, were employed in the Examples: A—without applying a voltage, water-in-organic dispersion; B—a DC pulse electric signal was applied with a time interval of 14 seconds and a maximum voltage of 4 kV but without causing phase inversion (always water-in-organic); and C—phase inversion (from water-in-organic to organic-in-water) induced by applying a voltage of 5.6 kV. The results show that condition C gives the best results for mass transfer (took the shortest time to reach the equilibrium state). After normalization, B and A look approximately the same. This shows that introducing phase inversion by applying electric fields can enhance mass transfer between two liquid phases. This behavior occurs because of interfacial motion, surface circulation, and surface renewal caused by phase inversion.

Accordingly, as can be seen by the preceding, the present invention provides a method of controlling phase inversions in liquid-liquid dispersions to prevent an inversion from occurring. The present invention also provides a method of correcting a phase inversion without shutting down an ongoing process. Additionally, the present invention provides a method of increasing the volume fraction of a dispersed organic phase without causing a phase inversion. Finally, the present invention provides a method for enhancing mass-transfer of a solute from one phase to another in a liquid-liquid dispersion.

What is claimed is:

1. A method for preventing phase inversions in a liquid-liquid dispersion comprising:

applying an electric field to the liquid-liquid dispersion to cause a first liquid of the liquid-liquid dispersion to remain in a continuous phase and to cause a second liquid of the liquid-liquid dispersion to remain dispersed in the continuous phase.

2. The method of claim 1, wherein the first liquid is an aqueous liquid and the second liquid is an organic liquid.

3. The method of claim 1, wherein the first liquid has a higher conductivity than the second liquid.

4. The method of claim 1, wherein the first liquid is polar and the second liquid is non-polar.

5. The method of claim 1, wherein the electric field is produced by an electric signal selected from AC, DC, or pulsed DC.

6. The method of claim 1, wherein the electric field has an applied voltage of from about 20 to about 5000 V.

7. The method of claim 1, further comprising agitating the dispersion using agitation means.

8. The method of claim 7, wherein the agitation means are selected from a mixing device, a sonication device, or a flow device.

9. A method for causing phase inversions in a liquid-liquid dispersion comprising a first liquid dispersed within a second liquid continuous phase, the method comprising:

applying an electric field to the liquid-liquid dispersion to cause the first liquid to coalesce and become the continuous phase while the second liquid becomes dispersed within the first liquid continuous phase.

10. The method of claim 9, wherein the first liquid is an aqueous liquid and the second liquid is an organic liquid.

11. The method of claim 9, wherein the first liquid has a higher conductivity than the second liquid.

12. The method of claim 9, wherein the first liquid is polar and the second liquid is non-polar.

13. The method of claim 9, wherein the electric field is produced by an electric signal selected from AC, DC, or pulsed DC.

14. The method of claim 9, wherein the electric field has an applied voltage of from about 20 to about 5000 V.

15. The method of claim 9, further comprising agitating the dispersion using agitation means.

16. The method of claim 15, wherein the agitation means are selected from a mixing device, a sonication device, or a flow device.

17. A method for increasing a volume fraction of a dispersed organic liquid phase without causing phase inversions in a liquid-liquid dispersion comprising:

applying an electric field to the liquid-liquid dispersion; and adding an amount of the organic liquid to the dispersion to increase the volume fraction to a level at or above the volume fraction which would cause the organic phase to become continuous if no electric field were applied.

18. The method of claim 17 further comprising the step of:

determining the volume fraction of the organic phase above which the organic phase would become continuous in the presence of the electric field.

19. The method of claim 17, wherein the electric field is produced by an electric signal selected from AC, DC, or pulsed DC.

20. The method of claim 17, wherein the electric field has an applied voltage of from about 20 to about 5000 V.

21. The method of claim 17, further comprising agitating the dispersion using agitation means.

22. The method of claim 21, wherein the agitation means are selected from a mixing device, a sonication device, or a flow device.

23. A method for enhancing mass transfer rates in a liquid-liquid dispersion comprising:

alternately applying and disengaging an electric field to the liquid-liquid dispersion to cause the liquid-liquid dispersion to undergo a phase inversion each time the electric field is turned on or off; wherein the liquid-liquid dispersion comprises a first liquid phase which is continuous and a second liquid phase which is dispersed within the first liquid phase; further wherein the liquid-liquid dispersion has a volume fraction of the second liquid located above an ambivalence region of the liquid-liquid dispersion.

24. The method of claim 23, wherein the first liquid is an aqueous liquid and the second liquid is an organic liquid.

25. The method of claim 23, wherein the first liquid has a higher conductivity than the second liquid.

26. The method of claim 23, wherein the first liquid is polar and the second liquid is non-polar.

27. The method of claim 23, wherein the electric field is produced by an electric signal selected from AC, DC, or pulsed DC.

28. The method of claim 23, wherein the electric field has an applied voltage of from about 20 to about 5000 V.

29. The method of claim 23, further comprising agitating the dispersion using agitation means.

30. The method of claim 29, wherein the agitation means are selected from a mixing device, a sonication device, or a flow device.

31. The method of claim 23, wherein the method is used in an emulsion polymerization process.

32. The method of claim 23, wherein the method is used in a chemical separation process.

* * * * *